(12) United States Patent
Guruswamy et al.

(10) Patent No.: US 12,293,234 B2
(45) Date of Patent: May 6, 2025

(54) SYSTEM AND METHOD FOR GENERATING TIME-BASED CONTEXTUAL GRAPH IN CLOUD COMPUTING ENVIRONMENT

(71) Applicant: UNO.AI, INC., Palo Alto, CA (US)

(72) Inventors: Murugesan Guruswamy, San Jose, CA (US); Griffin Maxwell Brome, Concord, CA (US); Kaixin Huang, Arcadia, CA (US); Sahaj Tushar Gandhi, Sunnyvale, CA (US); Shashank Tiwari, Palo Alto, CA (US); Stephanie Yuen-Kwan Knill, Pitt Meadows (CA); Sukhvir Singh, San Jose, CA (US)

(73) Assignee: UNO.AI, INC., Palo Alto, CA (US)

( * ) Notice: Subject to any disclaimer, the term of this patent is extended or adjusted under 35 U.S.C. 154(b) by 224 days.

(21) Appl. No.: 18/335,199

(22) Filed: Jun. 15, 2023

(65) Prior Publication Data
US 2024/0045734 A1 Feb. 8, 2024

Related U.S. Application Data

(60) Provisional application No. 63/370,530, filed on Aug. 5, 2022.

(51) Int. Cl.
*G06F 9/50* (2006.01)

(52) U.S. Cl.
CPC .......... *G06F 9/5077* (2013.01); *G06F 9/5072* (2013.01)

(58) Field of Classification Search
CPC ............................ G06F 9/5072; G06F 9/5077
See application file for complete search history.

(56) References Cited

U.S. PATENT DOCUMENTS

| | | | |
|---|---|---|---|
| 12,095,794 B1 * | 9/2024 | Karaje | H04L 67/306 |
| 2017/0289187 A1 | 10/2017 | Noel et al. | |
| 2018/0081943 A1 | 3/2018 | Johnson et al. | |
| 2019/0163851 A1 | 5/2019 | Poston et al. | |
| 2020/0167784 A1 * | 5/2020 | Kursun | G06Q 20/4016 |
| 2020/0296138 A1 | 9/2020 | Crabtree et al. | |

(Continued)

*Primary Examiner* — Jonathan A Bui
(74) *Attorney, Agent, or Firm* — Jason C. Cameron

(57) ABSTRACT

A computer-implemented system and method for generating time-based contextual graph in cloud computing environment is disclosed. The system receives, from computing devices, requests corresponding to security anomaly analysis of cloud infrastructure-based resources and applications. The system identifies parent node and node attributes corresponding to parent node in cloud infrastructure-based resources and/or applications, based on requests. Further, system determines hierarchical node relationships between parent node and child nodes, based on identified node attributes. Furthermore, system analyses risks in context of security anomaly associated with cloud infrastructure-based resources and/or applications, based on hierarchical node relationships between parent node and child nodes. Further, system generates time-based contextual graph corresponding to analyzed risks in context of security anomaly, based on determined hierarchical node relationships. Furthermore, system outputs on display associated with the computing devices, result corresponding to analyzed risks in context of security anomaly using generated time-based contextual graph.

20 Claims, 13 Drawing Sheets

(56) References Cited

U.S. PATENT DOCUMENTS

| | | |
|---|---|---|
| 2020/0371857 A1* | 11/2020 | Guha .................... G06N 20/00 |
| 2021/0176187 A1 | 6/2021 | Gladney |
| 2023/0004441 A1* | 1/2023 | Sanchez ............... G06F 9/5055 |
| 2023/0385691 A1* | 11/2023 | Joblin .................. G05B 23/024 |
| 2023/0419221 A1* | 12/2023 | Sheppard ........... G06Q 10/0635 |

* cited by examiner

SYSTEM AND METHOD FOR GENERATING TIME-BASED CONTEXTUAL GRAPH IN CLOUD COMPUTING ENVIRONMENT

EARLIEST PRIORITY DATE

This application claims priority from a Provisional patent application filed in the United States of America having Patent Application No. 63/370,530, filed on Aug. 5, 2022, and titled "SYSTEM AND METHOD FOR SEARCH, FILTER, BOOKMARK, AND PLAYBACK INFRASTRUCTURE".

FIELD OF INVENTION

Embodiments of a present disclosure generally relate to graphical representations for cloud infrastructures, and more particularly to a system and method for generating time-based contextual graph in a cloud computing environment. The system searches, filters, bookmarks, and enables playback of the cloud infrastructure and application properties, policies, configurations, metrics, data flows, relationships, and interaction and behavioral states across time and multiple and heterogeneous clouds, and infrastructure providers.

BACKGROUND

Communications networks, also called Information Technology (IT) infrastructures, are difficult to manage. Changing the network configuration, by changing topology, adding a new machine or storage device, or changing attributes of such devices for example, are typically difficult manual tasks. This makes such changes expensive and error-prone. It also means that the change can take several hours or days to take place, limiting the rate at which reconfiguration can take place to take account of changing business demands.

Further, detecting a network intrusion is not sufficient to effectively understand and visualize how the purported attack may impact a computer network and the organizational mission functions that depend on continued network operations. Additionally, the obstacle to completely analyzing a computer network for vulnerabilities is not due to a lack of information, but rather the ability to assemble disparate pieces of information into an overall analytic picture for situational awareness, optimal courses of action, and maintaining mission readiness. Security analysts and operators can be overwhelmed by a variety of consoles from multiple security analysis tools, with each tool providing only a limited view of one aspect of the overall space under consideration. Tools such as security information and event management (SIEM) can help by normalizing data and bringing it together under a common framework. However, the data and events remain as individual pieces of information, rather than a comprehensive model of network-wide vulnerability paths, adversary activities, and potential mission impacts.

Conventional systems include network modeling tools for domain-based security and compromise path analysis. The conventional system computes compromise paths and creates tables for use by expert risk analysts. However, again the conventional system does not assess many types of risks to security including isolation of the network topology, therefore, in practice, the level of confidence provided by such a tool is not high enough.

Another conventional system deploys an agent-based system for the automatic configuration of firewalls to enforce security policies specifying that some machines should be connected, and others should not be connected in a network having a dynamic topology. The conventional system involves using a model of the network topology which will be updated as the network topology is altered. The conventional model includes information regarding the settings or configuration of security controls in the form of configurable firewalls at various places in the network. A drawback of the conventional system includes inefficient reconfiguration updates on changes in network topology. The inefficient reconfiguration update is the major source of risk and compromises the security or isolation of the network topology. Hence, in practice, the level of confidence provided by this conventional system is not high enough.

Hence, there is a need for an improved system and method for generating time-based contextual graphs in a cloud computing environment, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In an aspect of the present disclosure, a computer-implemented system for generating a time-based contextual graph in a cloud computing environment is disclosed. The system receives, from one or more computing devices, one or more requests corresponding to security anomaly analysis associated with at least one of cloud infrastructure-based resources and cloud infrastructure-based applications in a cloud computing environment. Further, the system identifies a parent node and one or more node attributes corresponding to the parent node in at least one of the cloud infrastructure-based resources and the cloud infrastructure-based applications, based on the one or more requests. Furthermore, the system determines one or more hierarchical node relationships between the parent node and one or more child nodes, based on the identified one or more node attributes. Additionally, the system analyses one or more risks in the context of the security anomaly associated with at least one of the cloud infrastructure-based resources and cloud infrastructure-based applications, based on the one or more hierarchical node relationships between the parent node and the one or more child nodes. Further, the system generates a time-based contextual graph corresponding to the analyzed one or more risks in the context of the security anomaly, based on the determined one or more hierarchical node relationships between the parent node and one or more child nodes. Furthermore, the system outputs on a display associated with the one or more computing devices, a result corresponding to the analyzed one or more risks in the context of the security anomaly using the generated time-based contextual graph.

In another aspect, a computer-implemented method for generating a time-based contextual graph in a cloud computing environment is disclosed. The method includes receiving, from one or more computing devices, one or more requests corresponding to security anomaly analysis associated with at least one of cloud infrastructure-based resources and cloud infrastructure-based applications in a cloud computing environment. Further, the method includes identifying a parent node and one or more node attributes corresponding to the parent node in at least one of the cloud infrastructure-based resources and the cloud infrastructure-based applications, based on the one or more requests. Furthermore, the method includes determining one or more hierarchical node relationships between the parent node and one or more child nodes, based on the identified one or more node attributes. Additionally, the method includes analyses one or more risks in the context of the security anomaly associated with at least one of cloud infrastructure-based resources and cloud infrastructure-based applications, based on the one or more hierarchical node relationships between the parent node and the one or more child nodes. Further, the method includes generating a time-based contextual graph corresponding to the analyzed one or more risks in the context of the security anomaly, based on the determined one or more hierarchical node relationships between the parent node and one or more child nodes. Furthermore, the method includes outputting on a display associated with the one or more computing devices, a result corresponding to the analyzed one or more risks in the context of the security anomaly using the generated time-based contextual graph.

In yet another aspect, a non-transitory computer-readable storage medium having instructions stored therein, when executed by a processor, cause the processor to receive, from one or more computing devices, one or more requests corresponding to security anomaly analysis associated with at least one of cloud infrastructure-based resources and cloud infrastructure-based applications in a cloud computing environment. Further, the processor identifies a parent node and one or more node attributes corresponding to the parent node in at least one of the cloud infrastructure-based resources and the cloud infrastructure-based applications, based on the one or more requests. Furthermore, the processor determines one or more hierarchical node relationships between the parent node and one or more child nodes, based on the identified one or more node attributes. Further, the processor analyses one or more risks in the context of the security anomaly associated with at least one of cloud infrastructure-based resources and cloud infrastructure-based applications, based on the one or more hierarchical node relationships between the parent node and the one or more child nodes. Furthermore, the processor generates a time-based contextual graph corresponding to the analyzed one or more risks in the context of the security anomaly, based on the determined one or more hierarchical node relationships between the parent node and one or more child nodes. Further, the processor outputs, on a display associated with the one or more computing devices, a result corresponding to the analyzed one or more risks in the context of the security anomaly using the generated time-based contextual graph.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DRAWINGS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment". "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1:
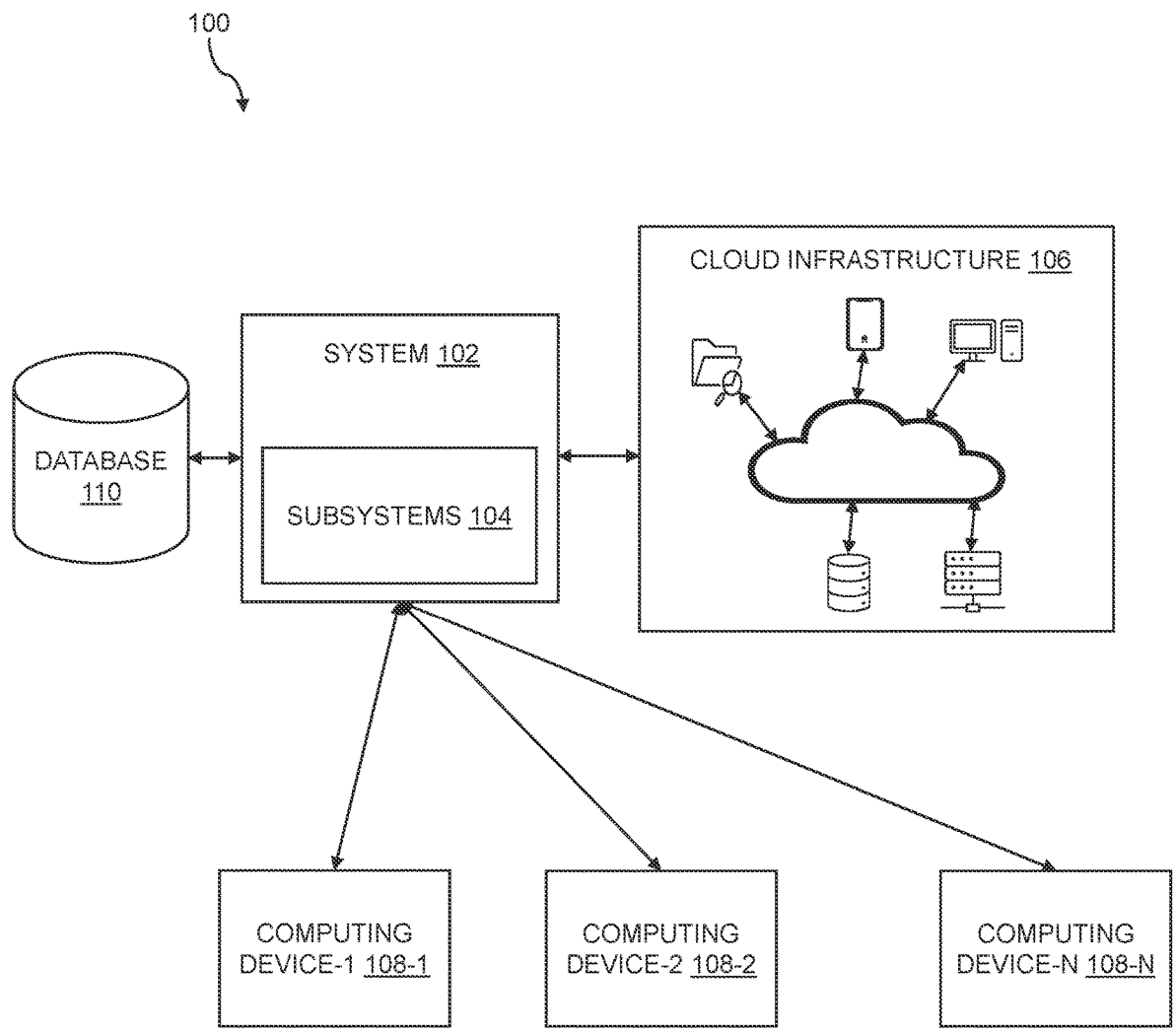
FIG. 1 illustrates an exemplary block diagram representation of a network architecture for a system for generating a time-based contextual graph in a cloud computing environment, in accordance with an embodiment of the present disclosure.

FIG. 1 illustrates an exemplary block diagram representation of a network architecture 100 for a system 102 for generating a time-based contextual graph in a cloud computing environment cloud infrastructure 106, in accordance with an embodiment of the present disclosure. The network architecture 100 may include the system 102, a plurality of subsystems 104, a cloud infrastructure 106 (also referred to as cloud computing environment, cloud infrastructure-based resources, and cloud infrastructure-based applications), one or more computing devices 108-1, 108-2, . . . , 108-N (collectively referred to as the computing devices 108 and individually referred to as the computing device 108), and a database 110.

The system 102 searches, filters, bookmarks, and playbacks the cloud infrastructure and application 106 properties, policies, configurations, metrics, data flows, relationships, and interaction and behavioral states across time and multiple and heterogeneous cloud, and infrastructure providers. The present invention allows a security analyst, an operations engineer, and other users concerned with infrastructure, application security, and reliability to investigate, analyze, and understand threats, attacks, breaches, vulnerabilities, and risks in a context of the use cases of at least one of (a) response to an incident, (b) investigation of a possible situation currently unfolding, (c) what-if analysis of a possible scenario, (d) forensics and post-mortem, and the like. The block diagram includes the system 102 which is communicatively connected to the cloud infrastructure and applications 106. The system 102 may include a plurality of subsystems 106 for providing search recommendations with a graphical representation with respect to a plurality of resources in the cloud infrastructure 106 based on search queries inputted by users.

In an embodiment, the system 102 may receive from one or more computing devices 108, one or more requests corresponding to security anomaly analysis associated with at least one of cloud infrastructure-based resources and cloud infrastructure-based applications in a cloud computing environment. In an embodiment, the one or more requests are a combination of natural language and a query language. In an embodiment, the one or more requests comprise, but are not limited to, a type of the plurality of resources to search for, an identity of the plurality of resources to search for, a type of edge relationship between the plurality of resources to search for, properties of the plurality of resources to search for, a type of the plurality of target resources to search for, additional inferred properties of the plurality of resources to search for, status of the plurality of resources to search on over time, and the like. In an embodiment, the security anomaly analysis may be based on at least one of one or more events and potential problem assessment (PPA).

In an embodiment, the system 102 may identify a parent node and one or more node attributes corresponding to the parent node in at least one of the cloud infrastructure-based resources and the cloud infrastructure-based applications, based on the one or more requests. The parent node in cloud infrastructure and cloud-based applications includes for example, Kubernetes cluster may be a parent node for Kubernetes node group or node pool instances, which in turn could be a parent for underlying nodes that represent compute units. The parent node may be identified based on but is not limited to, existing, derived, and predicted relationships, hierarchy, context data, configuration, and the like. In an embodiment, the one or more node attributes comprises at least one of a plurality of resources connected to the parent node and the one or more child nodes, policies associated with the parent node and the one or more child nodes, configurations associated with the parent node and the one or more child nodes, data flows associated with the parent node and one or more child nodes, type of the plurality of resources, one or more properties associated with the plurality of resources, an inference-based lookup results associated with the plurality of resources, a static relationship and a dynamic relationship of each of the plurality of resources.

In an embodiment, the system 102 may determine one or more hierarchical node relationships between the parent node and one or more child nodes, based on the identified one or more node attributes.

In an embodiment, the system 102 may analyze one or more risks in the context of the security anomaly associated with at least one of cloud infrastructure-based resources and cloud infrastructure-based applications, based on the one or more hierarchical node relationships between the parent node and the one or more child nodes.

In an embodiment, the system 102 may generate a time-based contextual graph corresponding to the analyzed one or more risks in the context of the security anomaly, based on the determined one or more hierarchical node relationships between the parent node and one or more child nodes. In an embodiment, the time-based contextual graph comprises, but is not limited to, identities (IDs) of the parent node and the resources, common ancestor nodes of each of one or more child nodes, depth of a deepest node in the subgraph rooted at the common ancestor, metadata associated with the one or more requests, metrics, the metadata, interrelationships of the parent node and the one or more child nodes, network elements, non-network elements, devices, lifecycle events, and the like.

In an embodiment, the system 102 may output, on a display associated with the one or more computing devices 108, a result corresponding to the analyzed one or more risks in context of the security anomaly using the generated time-based contextual graph.

In an embodiment, the system 102 may retrieve from the database 110, resource data corresponding to at least one of cloud infrastructure-based resources and cloud infrastructure-based applications. The resource data includes but is not limited to, metrics, metadata, interrelationships, network elements, non-network elements, connected devices, lifecycle events, and the like. In an embodiment, the system 102 may extract relationship information from the retrieved resource data. The relationship information comprises, but is not limited to, the plurality of resources, infrastructure, applications, policies, operational data, vulnerability scans, user comments, security events, and the like. In an embodiment, the system 102 may compare request information associated with the one or more requests with the relationship information to generate the time-based contextual graph.

In an embodiment, the system 102 may determine periodically a change in one or more node attributes. In an embodiment, the system 102 may obtain one or more edges associated with the one or more child nodes, based on determining the change in one or more node attributes. In an embodiment, the system 102 may analyze an edge relationship between each of the one or more edges associated with the one or more child nodes, based on obtaining the one or more edges. In an embodiment, the system 102 may modify the generated time-based contextual graph corresponding to the analyzed one or more risks in the context of the security anomaly, based on the analyzed edge relationship between one or more child nodes. In an embodiment, the system 102 may analyze the security anomaly based on the change in the one or more node attributes in the generated time-based contextual graph and the modified time-based contextual graph, to output the one or more risks in the context of the security anomaly.

In an embodiment, the system 102 may provide a timeline of the plurality of resources in the graphical representation using a time-centric audit trail view. In an embodiment, the time-centric audit trail view displays an exact modified time-based contextual graph, when the resources are changed.

In an embodiment, the system 102 may provide a for the cloud infrastructure and applications 106, policies, rules, and operational data. The system 102 dynamically extracts relationships to build a graphical representation based on at least one of the resources, infrastructure, applications, policies, operational data, vulnerability scans, user comments, security events, and the like. The system 102 further performs graph building modeling process of the plurality of resources including at least one of the metrics, metadata, interrelationships, network elements, non-network elements, IoT devices, lifecycle events, and the like. Further, the graphical representation is generated based on the relationship between the plurality of network sources.

In an embodiment, the system 102 may obtain inputs/queries from the users to fetch all infrastructure-related data including at least one of relationships, properties, and characteristics of the plurality of resources. In other words, the users can input search queries and request data including at least one of a type of the plurality of resources (i.e., a plurality of nodes), properties of the plurality of resources, relation with other resources, inference-based lookup, various resources, and their relationship (i.e., static or dynamic relationship) with other resources, and the like.

In an embodiment, the system 102 may map/compare the search queries to relevant entities (i.e., the relevant resources) for an accurate representation of what the user is looking for. The system 102 provides intelligent search recommendations based on the search queries inputted by the users. In an embodiment, the search queries may be a combination of natural language and query language. Additionally, the system 102 searches and modifies the graphical representation when there are any changes in the plurality of resources (i.e., evolution in the plurality of resources).

In an embodiment, the system 102 may search and modify the graphical representation with a specific time of single and multiple snapshots of changes of the plurality of resources in the graph-building modeling process. The system 102 further replays (i.e., playback) the resources and property changes in the graphical representation over time when the user selects the time ranges. Furthermore, the system 102 provides a timeline of resources in the graphical representation using a time-centric that shows an exact modified time-based contextual graph, when the resource is modified/changed. In an embodiment, the system 102 may be an application that is installed in a user device 108. In another embodiment, the user device 108 may be at least one of a mobile phone, a Smartphone, a personal computer, a notebook, and the like. In another embodiment, the system 102 may be an application that is installed on a server.

Figure 2:
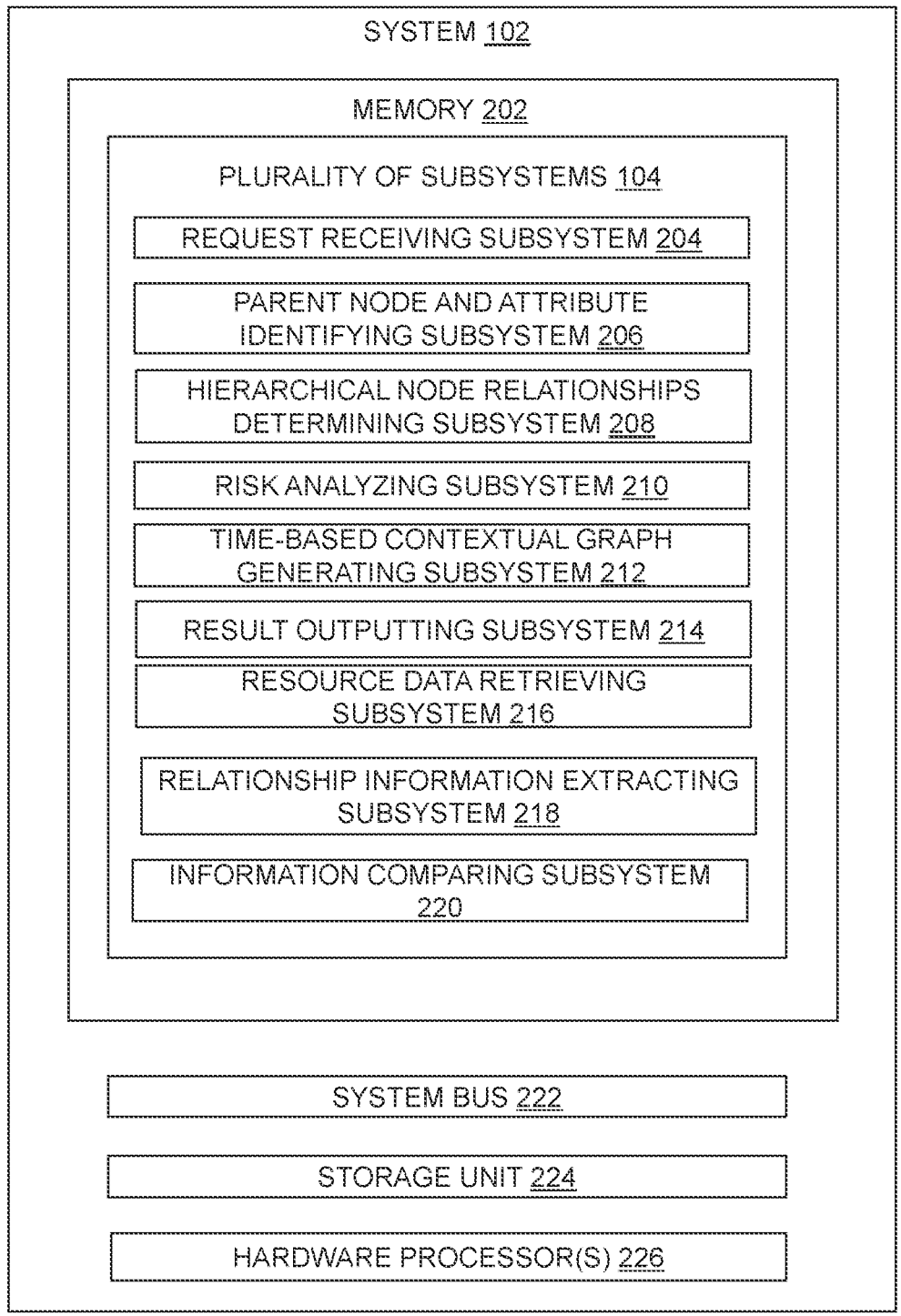
FIG. 2 illustrates an exemplary block diagram representation of a detailed view of the system, in accordance with an embodiment of the present disclosure.

FIG. 2 illustrates an exemplary block diagram representation of a detailed view of the system 102, in accordance with an embodiment of the present disclosure. The system 102 includes a hardware processor 226 a memory 202 coupled to the hardware processor 226, and a storage unit 224. The hardware processor 226, the memory 202, and the storage unit 224 are communicatively coupled through a system bus 222 or any similar mechanism. The memory 202 comprises a plurality of subsystems 104 in the form of programmable instructions executable by the hardware processor 226.

The plurality of subsystems 104 may include a request-receiving subsystem 204, a parent node and attribute-identifying subsystem 206, a hierarchical node relationship-determining subsystem 208, a risk analyzing subsystem 210, a time-based contextual graph-generating subsystem 212, a result-outputting subsystem 214, a resource data retrieving subsystem 216, a relationship information extracting subsystem 218, and an information comparing subsystem 220.

The hardware processor(s) 226, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof. The hardware processor 226 may also include embedded controllers, such as generic or programmable logic devices or arrays, application-specific integrated circuits, single-chip computers, and the like.

The memory 202 may be a non-transitory volatile memory and a non-volatile memory. The memory 202 may be coupled to communicate with the hardware processor 226, such as being a computer-readable storage medium. The hardware processor 226 may execute machine-readable instructions and/or source code stored in the memory 202. A variety of machine-readable instructions may be stored in and accessed from the memory 202. The memory 202 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 202 includes the plurality of systems 104 stored in the form of machine-readable instructions on any of the above-mentioned storage media and may be in communication with and executed by the hardware processor 226.

The storage unit 224 may be a cloud storage or a database such as those shown in FIG. 1. The storage unit 224 may store, but is not limited to, reports, insights, graphs, risk data, any other data, and combinations thereof. The storage unit 224 may be any kind of database such as, but not limited to, relational databases, dynamic databases, monetized databases, scalable databases, cloud databases, distributed databases, any other databases, and a combination thereof.

In an embodiment, the system 102 may execute the request receiving subsystem 204 to receive from one or more computing devices 108, one or more requests corresponding to security anomaly analysis associated with at least one of cloud infrastructure-based resources and cloud infrastructure-based applications in a cloud computing environment. In an embodiment, the one or more requests are a combination of natural language and a query language. In an embodiment, the one or more requests comprise, but are not limited to, a type of the plurality of resources to search for, an identity of the plurality of resources to search for, a type of edge relationship between the plurality of resources to search for, properties of the plurality of resources to search for, a type of the plurality of target resources to search for, additional inferred properties of the plurality of resources to search for, status of the plurality of resources to search on over time, and the like. In an embodiment, the security anomaly analysis may be based on at least one of one or more events and potential problem assessment (PPA).

In an embodiment, the system 102 may execute the parent node and attribute identifying subsystem 206 to identify a parent node and one or more node attributes corresponding to the parent node in at least one of the cloud infrastructure-based resources and the cloud infrastructure-based applications, based on the one or more requests. In an embodiment, the one or more node attributes comprises at least one of a plurality of resources connected to the parent node and the one or more child nodes, policies associated with the parent node and the one or more child nodes, configurations associated with the parent node and the one or more child nodes, data flows associated with the parent node and one or more child nodes, type of the plurality of resources, one or more properties associated with the plurality of resources, an inference-based lookup results associated with the plurality of resources, a static relationship and a dynamic relationship of each of the plurality of resources.

In an embodiment, the system 102 may execute the hierarchical node relationship determining subsystem 208 to determine one or more hierarchical node relationships between the parent node and one or more child nodes, based on the identified one or more node attributes.

In an embodiment, the system 102 may execute the risk analyzing subsystem 210 to analyze one or more risks in the context of the security anomaly associated with at least one of cloud infrastructure-based resources and cloud infrastructure-based applications, based on the one or more hierarchical node relationships between the parent node and the one or more child nodes.

In an embodiment, the system 102 may execute the time-based contextual graph generating subsystem 212 to generate a time-based contextual graph corresponding to the analyzed one or more risks in the context of the security anomaly, based on the determined one or more hierarchical node relationships between the parent node and one or more child nodes. In an embodiment, the time-based contextual graph comprises, but is not limited to, identities (IDs) of the parent node and the resources, common ancestor nodes of each of one or more child nodes, depth of a deepest node in the subgraph rooted at the common ancestor, metadata associated with the one or more requests, metrics, the metadata, interrelationships of the parent node and the one or more child nodes, network elements, non-network elements, devices, lifecycle events, and the like.

In an embodiment, the system 102 may execute the result outputting subsystem 214 to output, on a display associated with the one or more computing devices 108, a result corresponding to the analyzed one or more risks in the context of the security anomaly using the generated time-based contextual graph.

In an embodiment, the system 102 may execute the resource data retrieving subsystem 216 to retrieve from the database 110, resource data corresponding to at least one of cloud infrastructure-based resources and cloud infrastructure-based applications. The resource data includes, but is not limited to, metrics, metadata, interrelationships, network elements, non-network elements, connected devices, lifecycle events, and the like. In an embodiment, the system 102 may extract relationship information from the retrieved resource data. The relationship information comprises, but is not limited to, the plurality of resources, infrastructure, applications, policies, operational data, vulnerability scans, user comments, security events, and the like. In an embodiment, the system 102 may execute the information comparing subsystem 220 to compare request information associated with the one or more requests with the relationship information to generate the time-based contextual graph.

In an embodiment, the system 102 may execute the relationship information extracting subsystem 218 to determine periodically a change in one or more node attributes. In an embodiment, the system 102 may obtain one or more edges associated with the one or more child nodes, based on determining the change in one or more node attributes. In an embodiment, the system 102 may analyze an edge relationship between each of the one or more edges associated with the one or more child nodes, based on obtaining the one or more edges. In an embodiment, the system 102 may modify the generated time-based contextual graph corresponding to the analyzed one or more risks in the context of the security anomaly, based on the analyzed edge relationship between one or more child nodes. In an embodiment, the system 102 may analyze the security anomaly based on the change in the one or more node attributes in the generated time-based contextual graph and the modified time-based contextual graph, to output the one or more risks in the context of the security anomaly.

In an embodiment, the system 102 may provide a timeline of the plurality of resources in the graphical representation using a time-centric audit trail view. In an embodiment, the time-centric audit trail view displays an exact modified time-based contextual graph, when the resources are changed.

In an embodiment, the superset of the plurality of keywords includes a type of the plurality of resources being searched for, an identity of the plurality of resources being searched for, a type of edge relationship between the plurality of resources being searched for, properties of the plurality of resources being searched for, a type of the plurality of target resources being searched for, additional inferred properties of the plurality of resources being searched for, and status of the plurality of resources being searched on over time.

For example, the autocomplete algorithm fetches input parameters of the plurality of resources and the edges between the plurality of resources in the form of strings. The example strings may be (a) node_type (string specifying the types of nodes to search for), (b) node_id (string specifying the specific node to search for), (c) Rel (string specifying the type of edge relationship to search for), (d) Properties (a comma-separated string containing the property names, operators, and values to base the search on), (e) target_node_type (string specifying the node type for second level searches), (f) add_on_type (string specifying the addon table to search for (e.g., events and metrics)), (g) add_on_properties (dictionary containing the property names, operators, and values to search for in addons), and (h) resource_status (diff_status) (string specifying the type of diff to search for). The autocomplete algorithm then outputs a list of keywords that are most relevant to the user's search query. In an embodiment, the autocomplete algorithm can be programmed as given below:

Fetch all nodes from a graph $(N) = \Sigma ki=0 Ni$

Fetch all edges attached to the nodes $(E) = \Sigma ki=0 Ei$ $R_o \leftarrow N_i \cup E_i$ (a superset of all relevant keywords of importance to the user)

$R_o \leftarrow R_o \subseteq N_k$ where $N_k$ is the Node type being searched for $R_o \leftarrow R_o \subseteq N_k$ where $N_k$ is the Node id being searched for $R_o \leftarrow R_o \subseteq P_k$ where $P_k$ is the property being searched for $R_o \leftarrow R_o \subseteq N_k$ where $N_k$ is the target node type being searched for $R_o \leftarrow R_o \subseteq N_k$ where $AP_k$ is the additional inferred Properties being looked $R_o \leftarrow R_o \subseteq RS_k$ where $RS_k$ is the status of the resource being searched over time The system 102 includes a data-requesting subsystem 210 that is communicatively connected to the hardware processor 226. The data requesting subsystem 210 receive a request through a plurality of search queries inputted by the user for providing data related to at least one of the type of the plurality of resources, the properties of the plurality of resources, the inference-based lookup, the static and dynamic relationship of the plurality of resources with other resources.

The system 102 includes a queries comparison subsystem 212 that is communicatively connected to the hardware processor 226. The queries comparison subsystem 212 compares the plurality of search queries inputted by the user with the plurality of keywords that are relevant to the plurality of resources for generating a corresponding graphical representation expected by the user using a graph search algorithm.

The graph search algorithm creates a list with the plurality of resources. Further, the graph search algorithm further obtains the plurality of search queries from the user. In an embodiment, the plurality of queries may include at least one of a type of the plurality of resources to search for, an identity of the plurality of resources to search for, a type of edge relationship between the plurality of resources to search for, properties of the plurality of resources to search for, a type of the plurality of target resources to search for, additional inferred properties of the plurality of resources to search for, and status of the plurality of resources to search on over time.

The graph search algorithm further compares the plurality of search queries with the plurality of keywords relevant to the plurality of resources. The graph search algorithm further stores result with respect to the plurality of resources in the created list based on the comparison between the plurality of search queries with the plurality of keywords relevant to the plurality of resources. Further, the graph search algorithm outputs the results including at least one of a list with identities of the plurality of resources in second-level searches, a list with identities of qualified resources based on the search query, a common ancestor of each resource involved in the search query, depth of the deepest resource in a subgraph rooted at the common ancestor, and relevant information for the search query inputted by the user. Finally, the graph search algorithm generates the corresponding graphical representation based on the output results.

For example, the graph search algorithm obtains the plurality of search queries as input parameters from the user in the form of strings. The example strings may be (a) node type (string specifying the types of nodes to search for), (b) node_id (string specifying the specific node to search for), (c) Rel (string specifying the type of edge relationship to search for), (d) Properties (dictionary containing the property names, operators, and values to search for), (e) Target_node_type (string specifying the node type for second level searches), (f) add_on_type (string specifying the addon table to search for (e.g., events and metrics)), (g) add_on_properties (dictionary containing the property names, operators, and values to search for in addons), and (h) resource_status (diff_status) (string specifying the type of diff to search for).

The graph search algorithm then outputs the results in the form of strings. For example, the output results include (a) source_nodes (a list containing ids of source nodes (i.e., the resources) in second-level searches). (b) qualifying_nodes (a list containing the ids of the nodes that are the final result of a search query), (c) Common_ancestor (the common ancestor of every node involved in the search query), (d) Depth_of_deepest_result (the depth of the deepest node in the subgraph rooted at the common ancestor), and (e) metadata (relevant useful information (e.g., response_time) for the input search query). In an embodiment, the graph search algorithm can be programmed as given below:

Define a list called $R_o$ and total nodes $(N) = \Sigma^k_{i=0} N_i$ to store results from below 5 steps R→R∪N wherever node class matches the type ofnode R→R∪N where properties match R→R∪N where the edge relationship matches the source or target relationship, and a node is the source or target R→R∪N where resource changes match R→R∪N where addon properties match If the target node type is defined, define an empty list T:

T→T∪N where node class matches target node type, and the nodes are connected

T→T∪N where node class matches target node type and the node is on a path to the root T→T∪N where node class matches target node type and the node is descendant Least common ancestor=LCA (R∪T)

Depth of deepest result=Max Depth (R∪T)

The system 102 includes a recommendation subsystem that is communicatively connected to the hardware processor 226. The recommendation subsystem provides a search recommendation with the corresponding graphical representation for the search queries inputted by the user. In an embodiment, the corresponding graphical representation for the search queries represents the data related to at least one of the type of the plurality of resources, the properties of the plurality of resources, the inference-based lookup, the static and dynamic relationship of the plurality of resources with other resources, which are expected by the user.

The system 102 includes a graph modification subsystem that is communicatively connected to the hardware processor 226. The graph modification subsystem searches and modifies the graphical representation when the plurality of resources is changed (i.e., the evolution of the plurality of resources) over time. The graph modification subsystem further searches and modifies the graphical representation with specific time of single and multiple snapshots of changes of the plurality of resources in the graph building modelling process.

The system 102 includes a graph replay subsystem that is communicatively connected to the hardware processor 226. The graph replay subsystem the plurality of resources and changes with respect to the properties of the plurality of resources in the graphical representation over time when the user selects time ranges. The system 102 includes a timeline subsystem that is communicatively connected to the hardware processor 226. The timeline subsystem provides a timeline of the plurality of resources using a time-centric audit trail view. In an embodiment, the time-centric audit trail view helps to display the exact modified time-based contextual graph, when the resource is changed.

The graph difference algorithm is configured to select the plurality of resources from the two snapshots of the graphical representation with the top two timestamps and convert them to sets for O(1) access time. In an embodiment, the two timestamps may include a first timestamp that is referred to be a recent snapshot ($S_t$) of the graphical representation and a second timestamp that is referred to be a snapshot ($S_{t-1}$) of the graphical representation before the recent snapshot.

The graph difference algorithm computes deleted ($S_{t-1}-S_t$) and added ($S_t-S_{t-1}$) values based on the two snapshots with the top two timestamps. The graph difference algorithm populates a node difference table for each of the deleted and added values and sets the old state and new state of the two snapshots to null value. The graph difference algorithm further creates an entry in the node difference table when the resource is not identical between both snapshots. Additionally, the graph difference algorithm computes differences in both the snapshots to determine edges between the plurality of resources and populate an edge difference table. In an embodiment, the graph difference algorithm can be programmed as given below:

Select all nodes from the top two timestamps (the most recent snapshot & one before it), convert to sets for access time, denote these as and deleted=$S_{t-1}-S_t$ added=$S_t-S_{t-1}$ Populate the node diffs table for each of the values in "deleted" and "added", and set the old state or new state to null.

For, if the node is not identical between both sets, create an entry in the node diffs table For edges, compute the set differences, then populate the edge diffs table.

The system 102 allows the users (e.g., the security analyst, the operation engineer, and the like) who are concerned with cloud infrastructure and application 106 security and reliability to investigate, analyze, and understand threats, attacks, breaches, vulnerabilities, and risks in the context of the below use cases effectively and efficiently.

Exemplary Scenario 1A

Consider a scenario of a "response to an incident". In this scenario, an alert includes a possible malicious program execution within a docker container running in a cloud environment. A user (i.e., a security analyst) wants to understand the possible blast radius and impact of that program execution. The user wants to analyze the scope of the attack and look for evidence of any breach or exploitation.

The process flow of the system 102 for the above exemplary situation-1A is (a) search for the docker container (i.e., a network interface) using its id or identifying properties of the docker container, (b) find the pod and compute instance within which the docker container is running, (c) look for any other docker containers and programs running on the same pod and on the same host by searching for siblings, (d) check for change in metric level shift, data flow patterns, modification of resource properties, and change in configuration or behavior in all sibling programs by simply searching and querying using natural language and a simple constraint definition language, (e) Look for audit log analytics to see any correlated incidents and changes the same time or in the same context, (f) Look through the program and its context evolution over time, (g) Playback evolution over time, (h) Ascertain risks and any evidence of breach or exploitation based on the results of this comprehensive search, querying, and walking through changes over time.

Exemplary Scenario 1B

Consider a scenario of a "response to an incident": A critical vulnerability may be found to be easily exploitable. A user (i.e., an analyst) needs to quickly check if any running programs in the infrastructure currently have this critical vulnerability.

The process flow of the system 102 for the above exemplary situation-1B is (a) identify the common vulnerabilities and exposures (CVE) or any other such identifier for the vulnerability, (b) search for all instances of programs currently running that have the critical vulnerability, (c) look at the prior snapshots of the cloud infrastructure 106, applications, services, configurations, and context to understand when this vulnerability was first introduced in the system and how long has it been around, (d) assess all the $1^{st}$ and $2^{nd}$-degree infrastructure and application elements and resources that could have been touched or impacted by the presence of this vulnerability, (e) chart out if the impact surface of this vulnerability has increased or decreased, (f) understand networking, application behavior, topology, and data flows to ascertain if the primary program or any of the $1^{st}$ and $2^{nd}$ degree connected resources could have provided opportunities for exploitation.

Exemplary Scenario 1C

Consider a scenario of "response to an incident": An alert suggests a firewall rule controlling network traffic is very permissive and has port 22 access to a few compute instances open from the internet.

The process flow of the system 102 for the above exemplary situation-1C is (a) map out all firewall rules as a searchable graph with ingress and egress rules and constraints, (b) search for all ingress definitions with port 22 open, (c) assess all internet protocol Classless Inter-Domain Routing (IP CIDR) ranges that have permission to access and make use this ingress rule, (d) map out the resources, application, and infrastructure blast radius of this particular firewall rule, and (e) assess if any of these entities in the blast radius are exploitable or have shown any evidence of a breach.

Exemplary Scenario 2A

Consider a scenario of an "investigation of a possible situation currently unfolding". Audit logs suggest unusual activity both in terms of type and patterns. A user (i.e., an engineer or an analyst) wants to understand if they are malicious and if any response is required immediately.

The process flow of the system 102 for the above exemplary situation-2A is (a) look at the activity analytics to understand which users and what roles were most active in this period, (b) search for all objects that were created, read, updated, or deleted by these users, (c) look at all resources, policies, extensions, and flows within 'n' degrees of separation from these objects that were touched, (d) walk through time and look at evolution over time to understand the changes, and (e) assess risk levels and threat surface impact based on this impact and evolution.

Exemplary Scenario 2B

Consider a scenario of the "investigation of a possible situation currently unfolding". A notification suggests multiple storage units within a broader cloud infrastructure 106 have misconfiguration and may have leaked sensitive information. The users (i.e., multiple engineers and analysts) need to collaborate and understand if the suspected problems are similar and linked.

The process flow of the system 102 for the above exemplary situation-2B is (a) search all storage units by type and the cloud provider on which they are hosted or available as a service, (b) look at events and changes over time and walk back and playback the changes, (c) bookmark particular states and time windows that the users (i.e., multiple engineers and analysts) need to view together and discuss, (d) share bookmarked states and resources across timeframes, (e) annotate, comment, playback, and assess simultaneously and collaborate in real-time, and (f) allow the users to incrementally add to the analysis and either help support a gathered evidence or question it, allowing for objective and fast inference and decision making.

Exemplary Scenario 2C

Consider a scenario of "investigation of a possible situation currently unfolding": Infrequently accessed datasets in a multi-region database are suddenly being accessed in large quantities. A user (i.e., an operations engineer) needs to quickly ascertain if this is something possibly malicious or alluding to infrastructure or application bugs.

The process flow of the system 102 for the above exemplary situation-2C is (a) list and chart out all data access and flow patterns from all the different regions from this multi-region database, (b) understand query patterns and service-to-service interactions by searching through and looking at operational data sets: logs, metrics, tracing data, and events for all services interacting with this data store, (c) playback these interactions with the data store over periods in the past and assess when such patterns may have surfaced in the past, (d) understand and map context change and study cloud infrastructure and application units 106 that could be 1 or 2 degrees of impact away.

Exemplary Scenario 3A

Consider a scenario of a "What if analysis of a possible scenario". A new application is deployed, and the security team wants to assess if any potential problems with the application could have a damaging effect in terms of security and reliability.

The process flow of the system 102 for the above exemplary situation-3A is (a) list all resources that could be affected directly and indirectly by the new application, (b) understand possible interactions and flows among this application and all $1^{st}$ and $2^{nd}$ degrees resources in the system, (c) ascertain what kind of exploits could be possible, (d) look at the blast radius from attacks strategies (e.g., privilege escalation or lateral movement), and (e) understand what kinds of flows and interactions in the past look similar to these hypothetical and what-if scenarios.

Exemplary Scenario 3B

Consider a scenario of the "What if analysis of a possible scenario": A misconfiguration or a vulnerability has been open for a long period. A user (i.e., a security researcher) wants to understand if that is exposing the organization to unnecessary risks.

The process flow of the system 102 for the above exemplary situation-3B is (a) to understand if a risk has increased or decreased because of the long periods such a problem has not been attended to, (b) study metrics and blast radius evolution over time using the system 102, (c) conduct what-if analysis with possible exploits and the available context, (d) study and evaluate possible breach or exploitation paths and understand the likelihood of those attacks, and (e) list of resources that could be possibly touched and the impact it may have on these resources.

Exemplary Scenario 4A

Consider a scenario of a "Forensics and postmortem": A data breach led to a loss of sensitive data. The investigation team needs to determine what data was stolen and which parts of the infrastructure and applications were impacted.

The process flow of the system 102 for the above exemplary situation-4A is (a) identify the main resource from where data was leaked, (b) understand threats and breach axis for all connected resources, policies, configurations, and data flows related to the main resource, (c) walk through and playback past states of these resources, policies, configurations, and data flows and understand how the risks have evolved, and (d) conduct what-if analysis of possible breach paths and possibly additional damages and ascertain probabilities and the likelihood of those happening.

Exemplary Scenario 4B

Consider a scenario of a "Forensics and postmortem": Credentials were exposed and there is evidence of unauthorized changes in some of the services.

The process flow of the system 102 for the above exemplary situation-4B is (a) search and list out all resources within the blast radius, (b) study data flow and operational data patterns to understand changes and formation of patterns that could point to malicious behavior, (c) evaluate possible highest risk interactions over time since the unauthorized access, and (d) playback and show controls that would patch and fix the problem.

Figure 3:
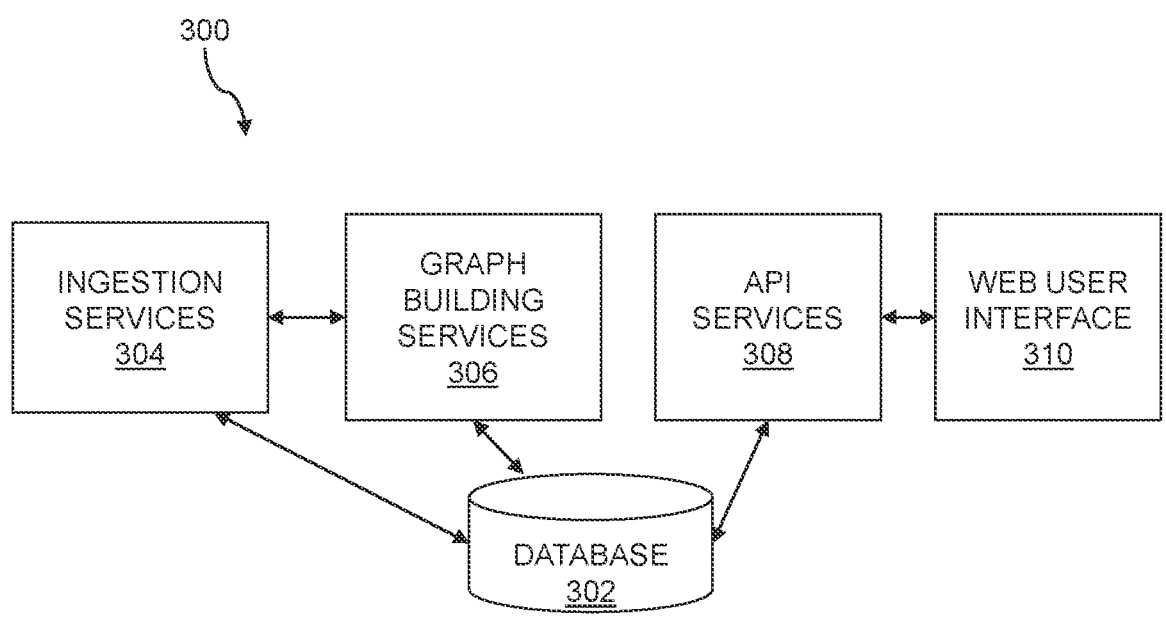
FIG. 3 illustrates an exemplary block diagram representation of a contextual graph-building process of a plurality of resources, in accordance with an embodiment of the present disclosure.

FIG. 3 illustrates an exemplary block diagram representation of a contextual graph-building process 300 of a plurality of resources, in accordance with an embodiment of the present disclosure. The system 102 performs various services including at least one of ingestion services 304, graph building services 306, and application programming interface (API) services 308 from the database 302. The API services provide output results through a web user interface 310 running on the user device 108. The ingestion services 304 are a distributed set of services that connect to multiple data sources using defined application programming interface(s) (API(s)) and using appropriate authentication schemes. The ingestion services 304 fetch data and metadata from the external sources and then loads and transforms them so it's in the appropriate structure and format for downstream processing. Further, ingestion services 304 indulge in data normalization, clean-up, annotation, and enrichment as appropriate. The graph building services 306 are a diverse set of tools, framework units, and platform services that enable the building of graph nodes and edges for each snapshot. The graph building services 306 also enable the calculation of state changes and persistence of evolution-related information. Other services include cataloging, analysis, and inference in the context of graph nodes, their inter-relationships, and the like. Further, the API services 308 may enable access to the system's platform and services, including graph services, analytical systems, and the intelligence mining system using standard protocols and data formats. These services also enable appropriate access control enforcement and data marshaling. Further, the web user interface 310 is a rich browser-based multi-channel application that allows users of the system 102 to access the capabilities and features provided by the system 102.

Figure 4:
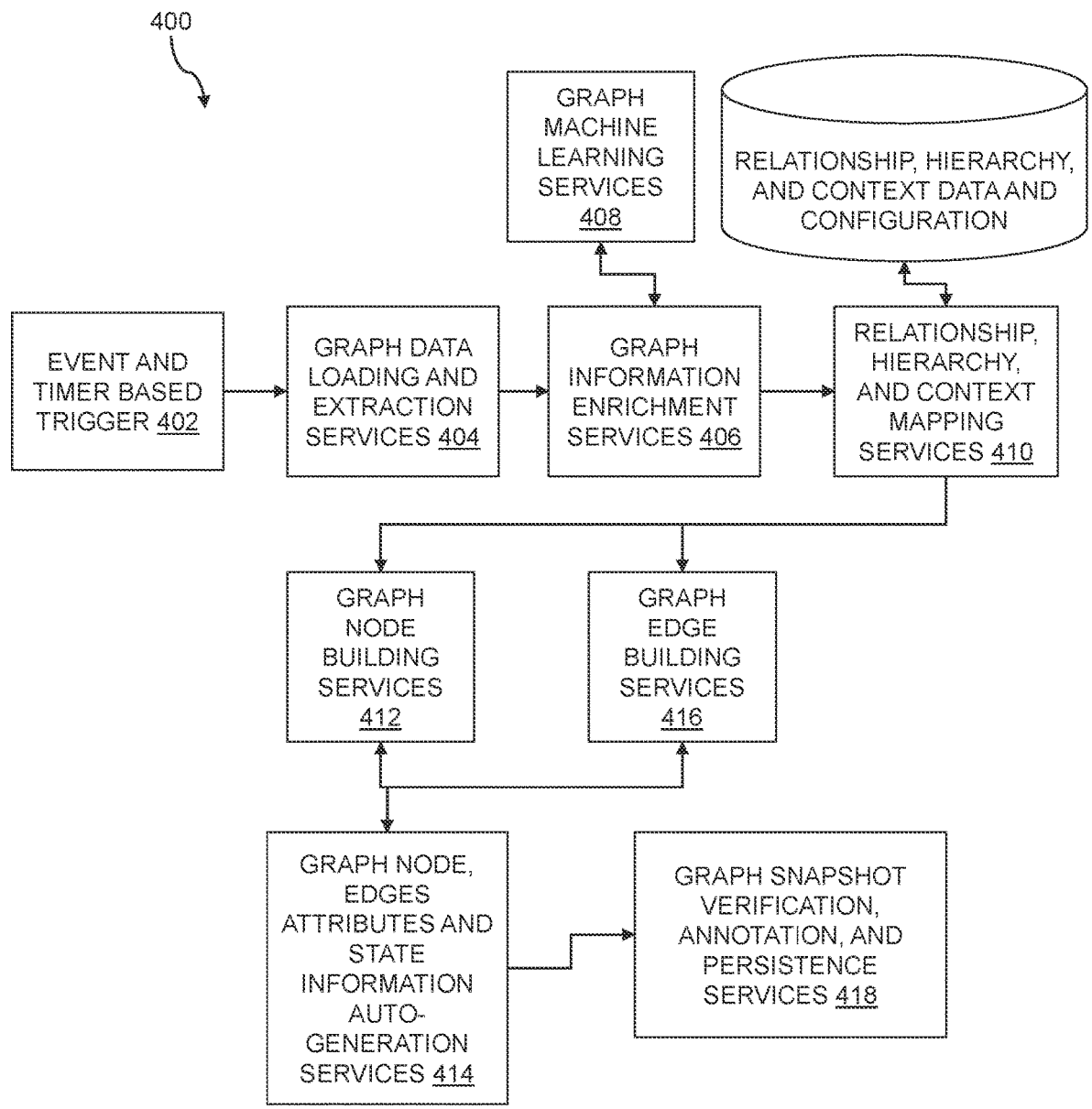
FIG. 4 illustrates an exemplary flow diagram representation of a graph-building modelling process of the plurality of resources, in accordance with an embodiment of the present disclosure.

FIG. 4 illustrates an exemplary flow diagram representation of a graph-building modelling process 400 of a plurality of resources, in accordance with an embodiment of the present disclosure. The graph-building modeling process 400 depicts that the system 102 performs the graph-building modeling process of the plurality of resources comprising, but not limited to, the metrics, the metadata, the interrelationships, the network elements, the non-network elements, the IoT devices, the lifecycle events, and the like.

At step 402, the method 400 includes, determining, by the processor 226, the types of events and timers that may trigger the data loading and extraction services. At step 404, the method 400 includes determining, by the processor 226, appropriate data sources to be used for the graph data loading and extraction services. At step 406, the method 400 includes implementing, by the processor 226, the graph information enrichment services to enhance the graph by adding additional data and relationships. At step 408, the method 400 includes integrating, by the processor 226, graph machine learning services to enable the graph to automatically learn and adapt over time. At step 410, the method 400 includes mapping, by the processor 226, a mapping methodology to establish the relationships, hierarchies, and contexts based on relationship data, hierarchy data, context data, and configuration data from a database.

At step 412, the method 400 includes generating, by the processor 226, graph nodes for the graph using the graph node building services. At step 414, the method 400 includes utilizing, by the processor 226, the graph node, edges attributes, and state information auto-generation services to automatically generate attributes and state information for the graph nodes. At step 416, the method 400 includes generating, by the processor 226, graph edges for the graph using the graph edge building services, by utilizing the graph node, edges attributes, and state information auto-generation services to automatically generate attributes and state information for the graph edges. At step 418, the method 400 includes verifying, by the processor 226, a graph snapshot, a graph annotation, and graph persistence.

Figure 5:
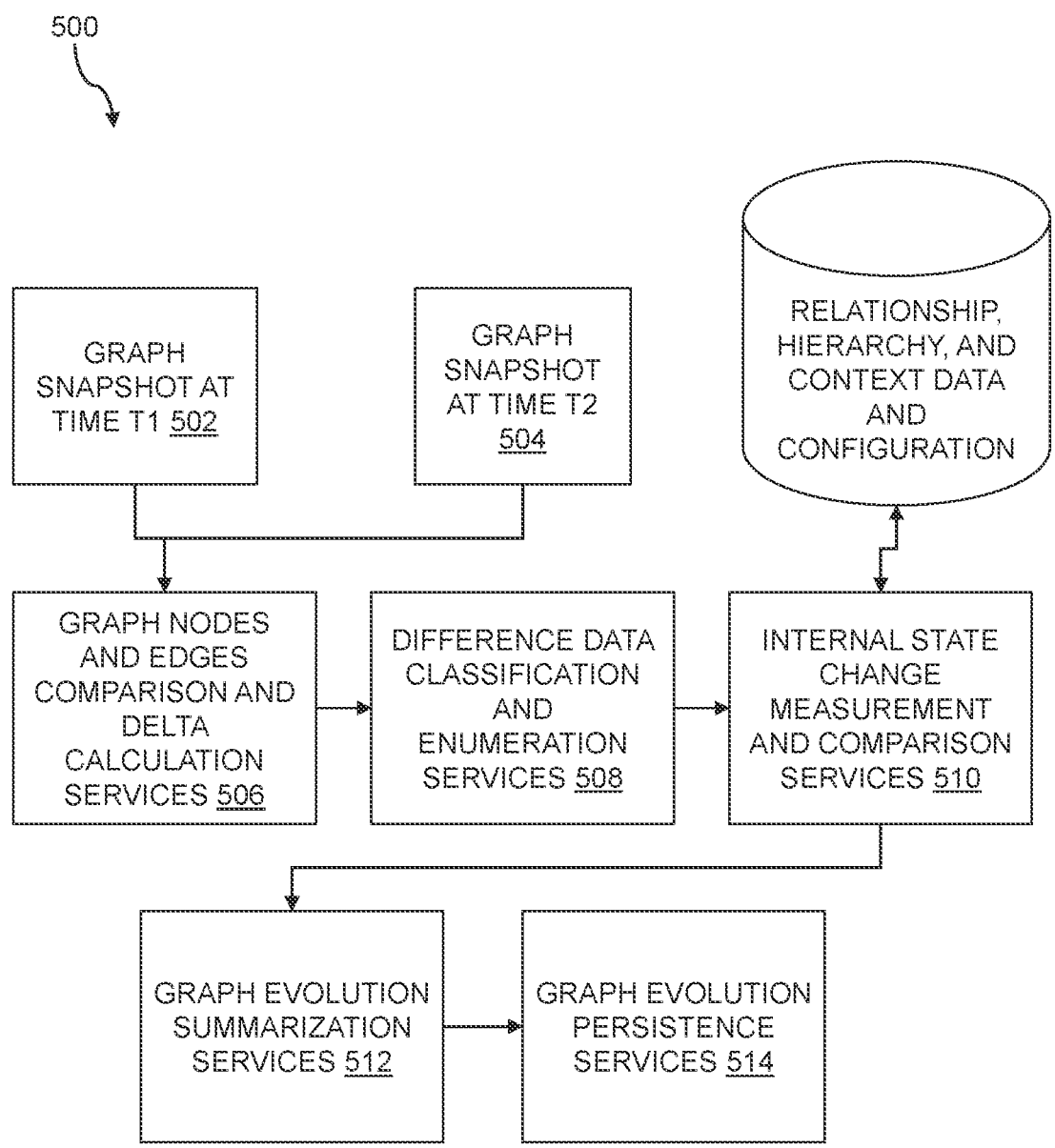
FIG. 5 illustrates an exemplary flow diagram representation of a method of modifying a graphical representation when the plurality of resources is changed (i.e., evolution of the plurality of resources) over time, in accordance with an embodiment of the present disclosure.

FIG. 5 illustrates an exemplary flow diagram representation of a method 500 of modifying a graphical representation when the plurality of resources is changed (i.e., the evolution of the plurality of resources) over time, in accordance with an embodiment of the present disclosure. The system 102 searches and modifies the graphical representation when the plurality of resources is changed over time. For example, the plurality of resources in a graph snapshot at time t1 e.g., of 1 AM to 2 AM on $12^{th}$ Jul. 2022 are changed from the graph snapshot at time t2 e.g., of 12 AM to 1 AM on $12^{th}$ Jul. 2022.

At step 502, the method 500 includes capturing, by the processor 226, a graph snapshot at time 't1' to record the state of the graph at a specific point in time. At step 504, the method 500 includes capturing, by the processor 226, another graph snapshot at time 't2' to record the state of the graph at a later point in time. At step 506, the method 500 includes comparing, by the processor 226, graph nodes and edges, and calculating delta differences between graph nodes and edges to compare the two graph snapshots at t1, and t2, for identifying the differences in the nodes and edges.

At step 508, the method 500 includes classifying, by the processor 226, difference data and enumerating the difference data for the identified differences in the nodes and edges. At step 510, the method 500 includes measuring and comparing, by the processor 226, an internal state change to measure and compare any internal state changes that have occurred between the two snapshots, based on the relationship data, hierarchy data, context data, and configuration data from the database. At step 512, the method 500 includes generating, by the processor 226, graph evolution summarization to provide a summary of the identified differences and changes over time, including trends and patterns. At step 514, the method 500 includes generating, by the processor 226, graph evolution persistence to store and persist the graph evolution data for future reference and analysis, including the snapshots, differences, changes, and summaries.

Figure 6:
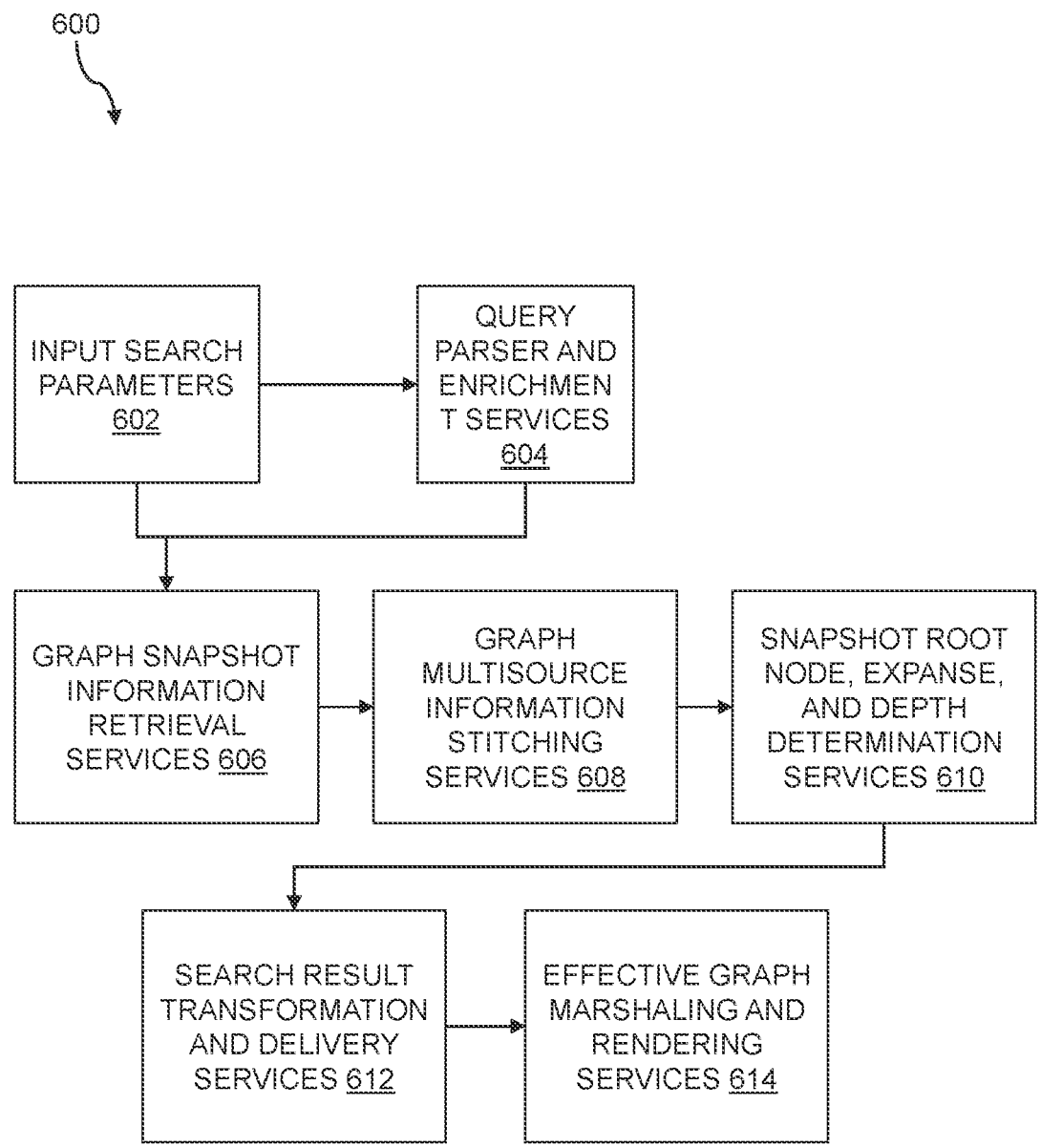
FIG. 6 illustrates an exemplary flow diagram representation of a method of modifying a graphical representation with a specific time of single and multiple snapshots of changes of the plurality of resources, in accordance with an embodiment of the present disclosure.

FIG. 6 illustrates an exemplary of a method 600 of modifying a graphical representation with a specific time of single and multiple snapshots of changes of the plurality of resources, in accordance with an embodiment of the present disclosure.

At step 602, the method 600 includes receiving, by the processor 226, a query comprising input search parameters to specify the criteria for the search. At step 604, the method 600 includes parsing, and enriching, by the processor 226, the query with additional information and context. At step 606, the method 600 includes retrieving, by the processor 226, graph snapshot information that matches the search criteria of the query. At step 608, the method 600 includes stitching, by the processor 226, graph multisource information to stitch together the information from multiple sources to provide a comprehensive view of the relevant information, based on the graph snapshot information. At step 610, the method 600 includes determining, by the processor 226, the snapshot root node, expanse, and depth of the graph for the search results, based on the graph multisource information. At step 612, the method 600 includes transforming, by the processor 226, the search result and providing the transformed search results in a desired format. At step 614, the method 600 includes marshaling and rendering, by the processor 226, the graph for optimal visualization and understanding of the search results.

Figure 7:
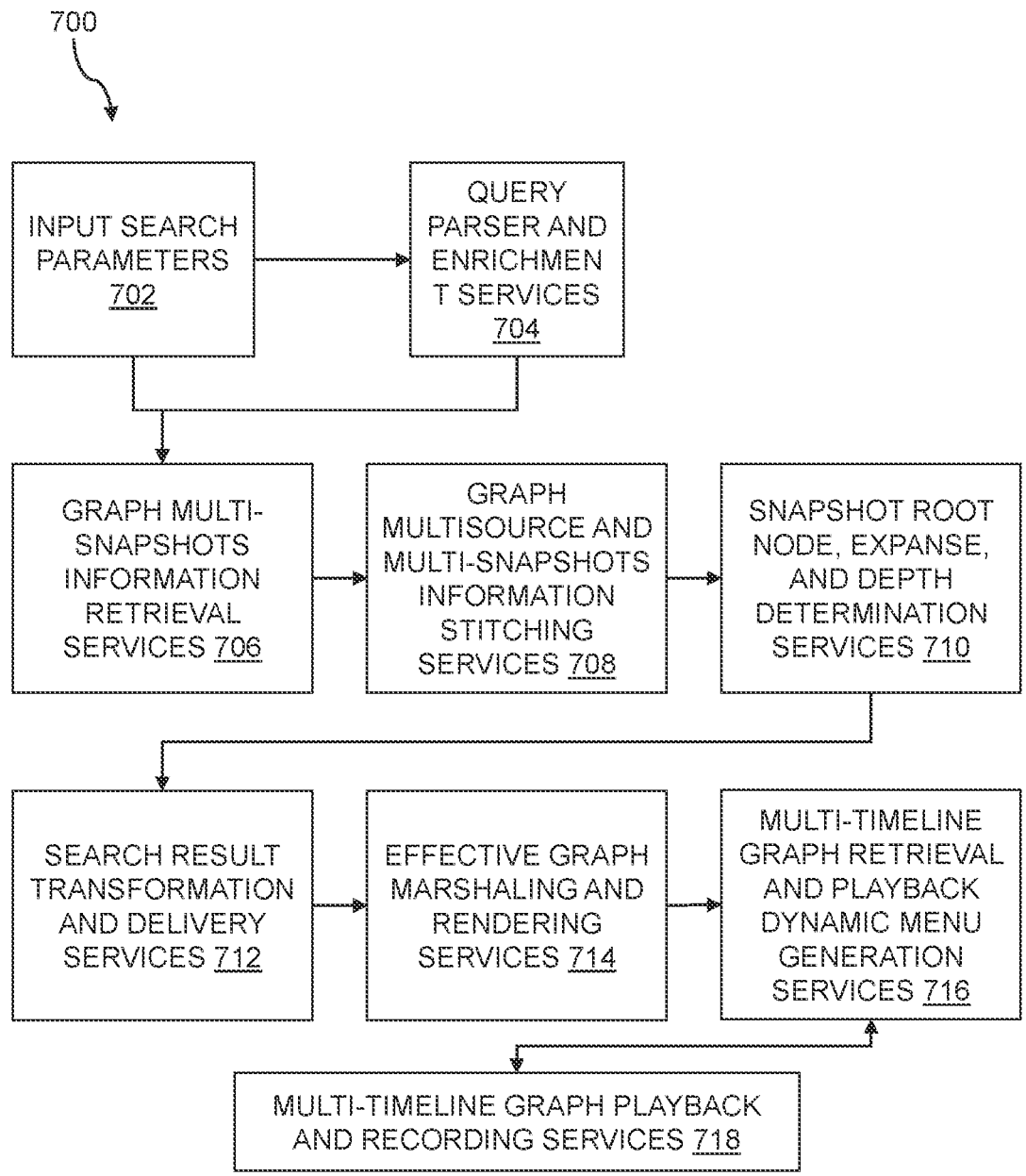
FIG. 7 illustrates an exemplary flow diagram representation of replaying method (i.e., playback) of the plurality of resources and changes with respect to the properties of the plurality of resources in the graphical representation over time, in accordance with an embodiment of the present disclosure.

FIG. 7 illustrates an exemplary flow diagram representation of replaying method 700 (i.e., playback) of the plurality of resources and changes with respect to the properties of the plurality of resources in the graphical representation over time, in accordance with an embodiment of the present disclosure.

At step 702, the method 700 includes receiving, by the processor 226, a query comprising input search parameters to define the search criteria for the graph. At step 704, the method 700 includes parsing and enriching, by the processor 226, the query for the search parameters. At step 706, the method 700 includes retrieving, by the processor 226, graph multi-snapshots information of the graph that match the search criteria across multiple timelines. At step 708, the method 700 includes stitching, by the processor 226, graph multisource, and multi-snapshots information to combine information from multiple sources and timelines to provide a comprehensive view of the graph. At step 710, the method 700 includes determining, by the processor 226, snapshot root node, expanse, and depth to identify the starting node, expanse, and depth of the search within the graph. At step 712, the method 700 includes transforming, by the processor 226, search results and delivering the transformed search results in a format that is easy to understand. At step 714, the method 700 includes marshaling and rendering, by the processor 226, the search results in a visually appealing and intuitive manner, including different layout options and visualization styles. At step 716, the method 700 includes retrieving, by the processor 226, a multi-timeline graph and generating playback dynamic menu that allows users to select and view different timelines and snapshots of the graph. At step 718, the method 700 includes providing, by the processor 226, multi-timeline graph playback and recording services to enable users to play back and record their interaction with the graph across multiple timelines and snapshots.

The system 102 may utilize a change algorithm for calculating the change of resources over time. In an embodiment, the change algorithm can be programmed as follows:

S is set of all Nodes or Edges where $(S)=\Sigma ki=0 Si$ t
deleted=St−1−St
added=St−St−1
Modified=St∩St−1

For example, the user selects the time ranges from 11 PM on $11^{th}$ Jul. 2022 to 1 PM on $12^{th}$ Jul. 2022 to playback the plurality of resources and changes with respect to the properties of the plurality of resources. Further, the system 102 annotates and bookmarks the changes in the plurality of resources and allows the user to share the graphical representation with the team.

Figure 8:
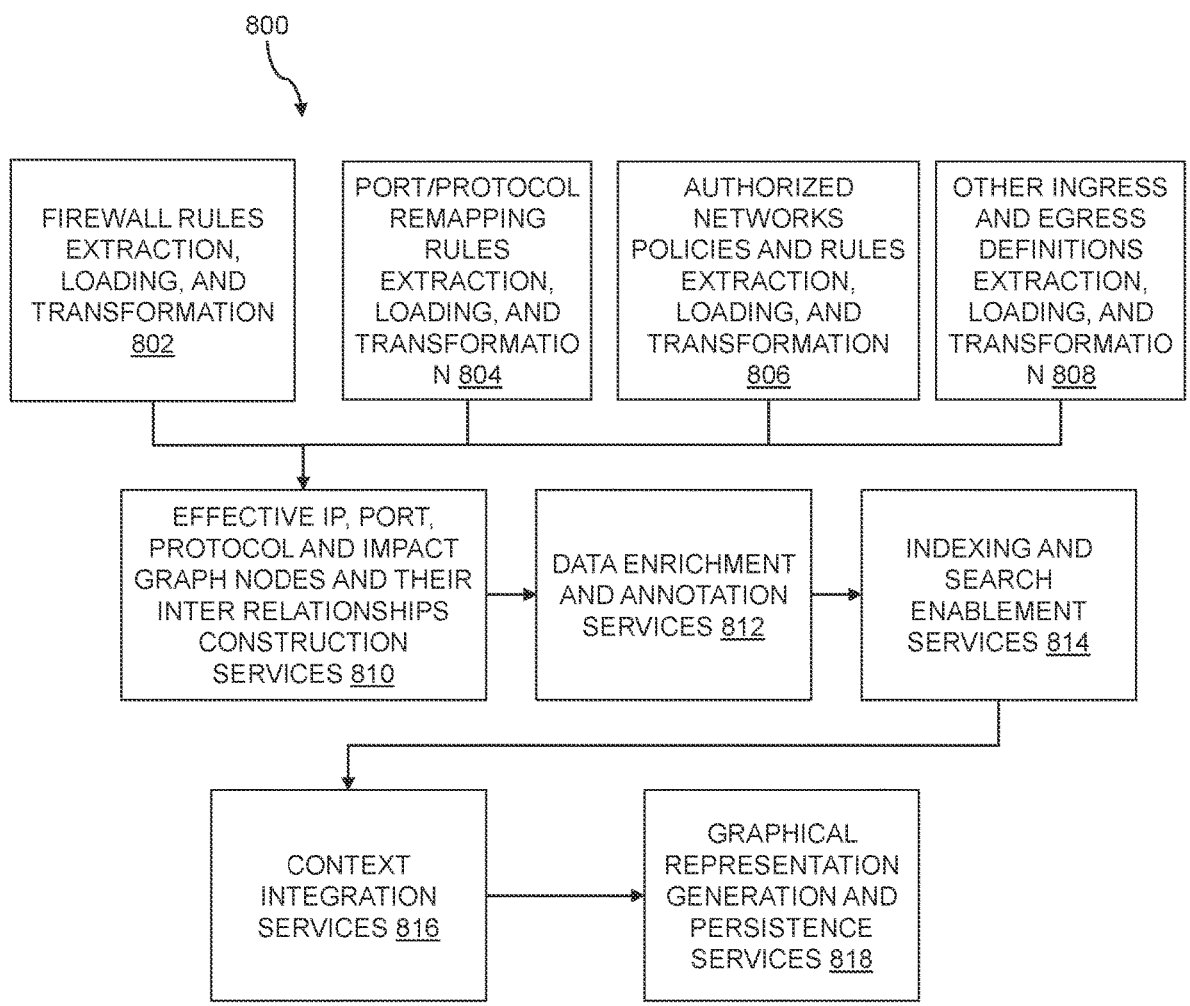
FIG. 8 illustrates an exemplary flow diagram representation of a searching method of ingress and egress definitions across graphical representation dimensions, in accordance with an embodiment of the present disclosure.

FIG. 8 illustrates an exemplary flow diagram representation of a searching method 800 of ingress and egress definitions across graphical representation dimensions, in accordance with an embodiment of the present disclosure. The ingress and egress definitions include firewall rules, overlay network policies, service mesh-based port/protocol remapping, and authorized network definitions.

At step 802, the method 800 includes extracting, by the processor 226, firewall rules, loading and transforming the extracted firewall rules into a format suitable for graph construction and analysis. At step 804, the method 800 includes extracting, by the processor 226, port/protocol remapping rules, including mappings between port numbers and protocols. The extracted port/protocol remapping rules, including mappings between port numbers and protocols, are loaded and transformed into a format suitable for graph construction and analysis. At step 806, the method 800 includes extracting, by the processor 226, authorized network policies and rules, including policies that define which IP addresses are authorized to access the network.

At step 808, the method 800 includes extracting, loading, and transforming, by the processor 226, other ingress and egress definitions, including any other policies or rules related to network access and traffic, into a format suitable for graph construction and analysis. At step 810, the method 800 includes generating, by the processor 226, IP, port, protocol, and impact graph nodes and their inter-relationships for the graph that represents the relationships between the extracted data, including IP addresses, port numbers, protocols, and their impact on the network. At step 812, the method 800 includes enriching and annotating, by the processor 226, the data such as the IP, port, protocol, and impact graph nodes and their inter-relationships.

At step 814, the method 800 includes indexing and searching, by the processor 226, the data to enable fast and efficient search of the graph for specific data points or patterns. At step 816, the method 800 includes integrating, by the processor 226, context data, to integrate the graph with other sources of data, such as threat intelligence feeds or vulnerability databases, to provide additional context and understanding of potential risks and issues. At step 818, the method 800 includes generating and persisting, by the processor 226, the graphical representation for visual representations of the graph, such as network topology maps or flow diagrams, to aid in understanding and decision-making.

For example, the system 102 maps all the required rules, ports, and protocols in another dimension to the surface underlying structure of the rules. The system 102 provides the graphical representation plotted in Two Dimensions (2D) that helps the user to analyze how the security groups are dependent on each other and affect each other. Further, the system 102 loops back and connects to the main graphical representation based on filtered rules and protocols.

Figure 9:
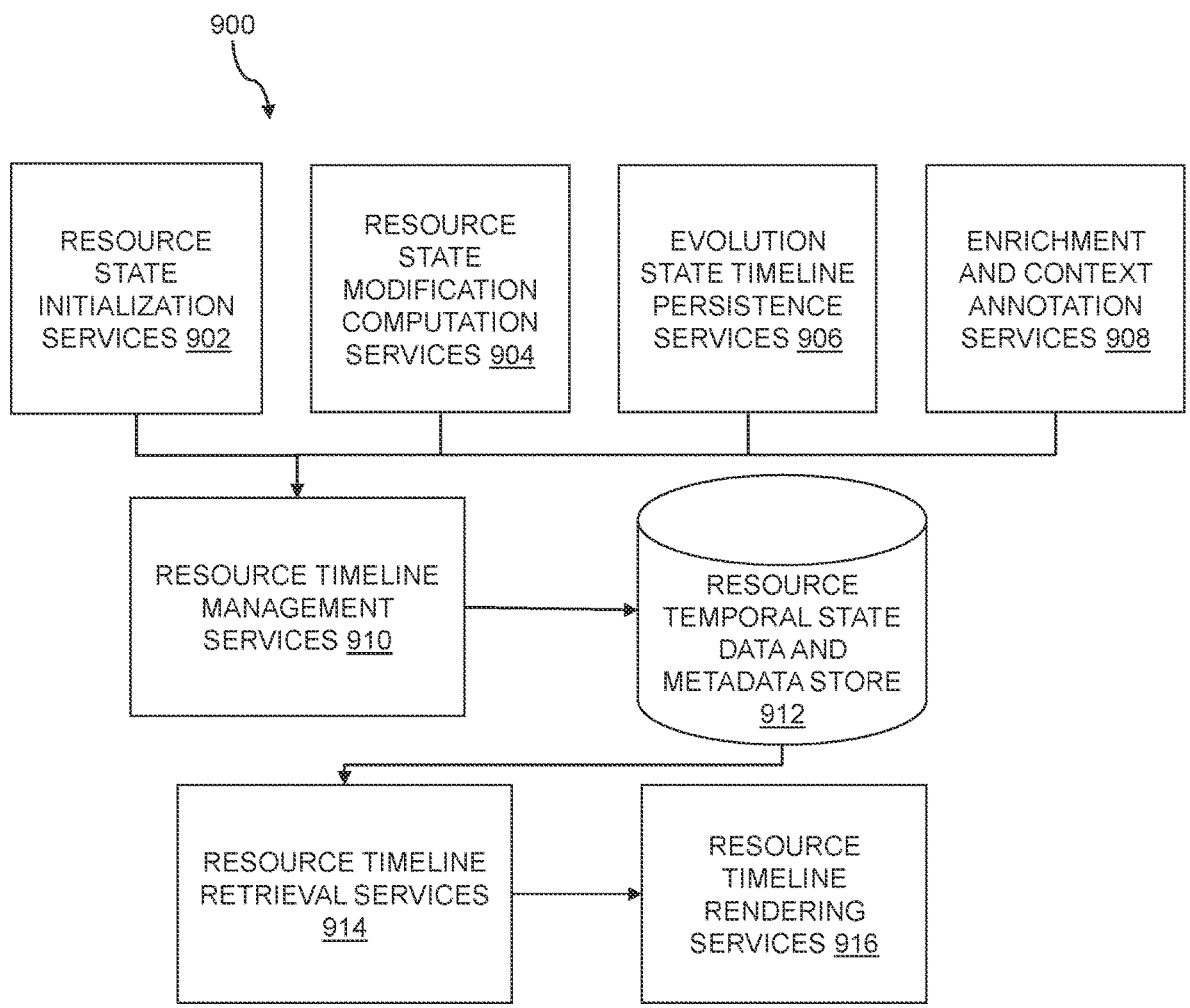
FIG. 9 illustrates an exemplary flow diagram representation of rendering method a timeline of the plurality of resources, in accordance with an embodiment of the present disclosure.

FIG. 9 illustrates an exemplary flow diagram representation of rendering method 900 of the timeline of the plurality of resources, in accordance with an embodiment of the present disclosure.

At step 902, the method 900 includes initializing, by the processor 226, resource state including any relevant data, metadata, and timestamps.

At step 904, the method 900 includes modifying and computing, by the processor 226, the resource state. At step 906, the method 900 includes persisting, by the processor 226, the evolution state timeline of the resource's evolution, including snapshots of the state of the resource at various points in time. At step 908, the method 900 includes enriching and annotating, by the processor 226, context data of the evolution state timeline.

At step 910, the method 900 includes managing, by the processor 226, resource timeline, including adding or removing snapshots and annotations, and controlling access and permissions. At step 912, the method 900 includes storing, by the processor 226, resource temporal state data and metadata for the resource timeline, including the state of the resource and any annotations or associated metadata in the database. At step 914, the method 900 includes retrieving, by the processor 226, a resource timeline from the database, to retrieve specific snapshots or sections of the resource timeline, based on criteria such as time range, annotations, or other metadata.

At step 916, the method 900 includes rendering, by the processor 226, resource timeline services for visual representations of the resource timeline, such as charts or graphs, to aid in understanding and decision-making.

For example, each resource may include a full timeline of every event in its life. The time-centric audit trail view displays the exact modified time-based contextual graph when the resource is changed. For example, the resource is created on $18^{th}$ Jun. 2022 at 6.50 PM, and the resources are changed on various timelines. Further, the resource is removed on $10^{th}$ Jul. 2022 at 1 PM.

Figure 10A:
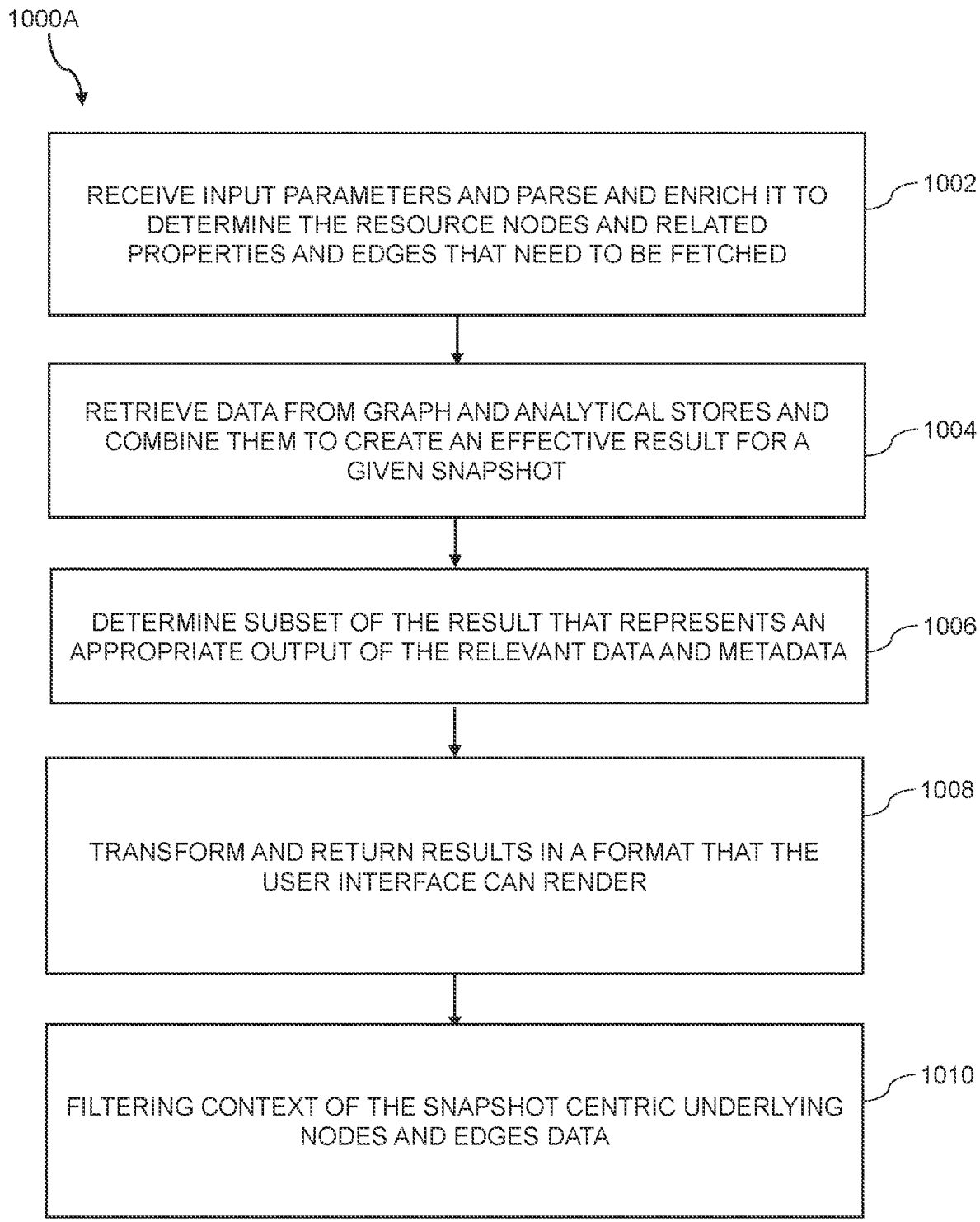
FIG. 10A illustrates an exemplary flow diagram representation of a simple key search query method for multi-cloud infrastructure and applications, in accordance with an embodiment of the present disclosure.

FIG. 10A illustrates an exemplary flow diagram representation of a simple key search query method 1000A for multi-cloud infrastructure and applications 106, in accordance with an embodiment of the present disclosure.

At step 1002, the method 1000A includes receiving, by the processor 226, input parameters. The input parameters are parsed and enriched to determine the resource nodes and related properties and edges that need to be fetched. At step 1004, the method 1000A includes retrieving, by the processor 226, data from the graph and analytical data stores and combining the data to create an effective result for a given snapshot. At step 1006, the method 1000A includes determining, by the processor 226, a subset of the result that represents an appropriate output of the relevant data and metadata.

At step 1006, the method 1000A includes transforming, by the processor 226, and return results in a format that the user interface can render. At step 1006, the method 1000A includes filtering, by the processor 226, the context of the snapshot-centric underlying nodes and edges data.

Figure 10B:
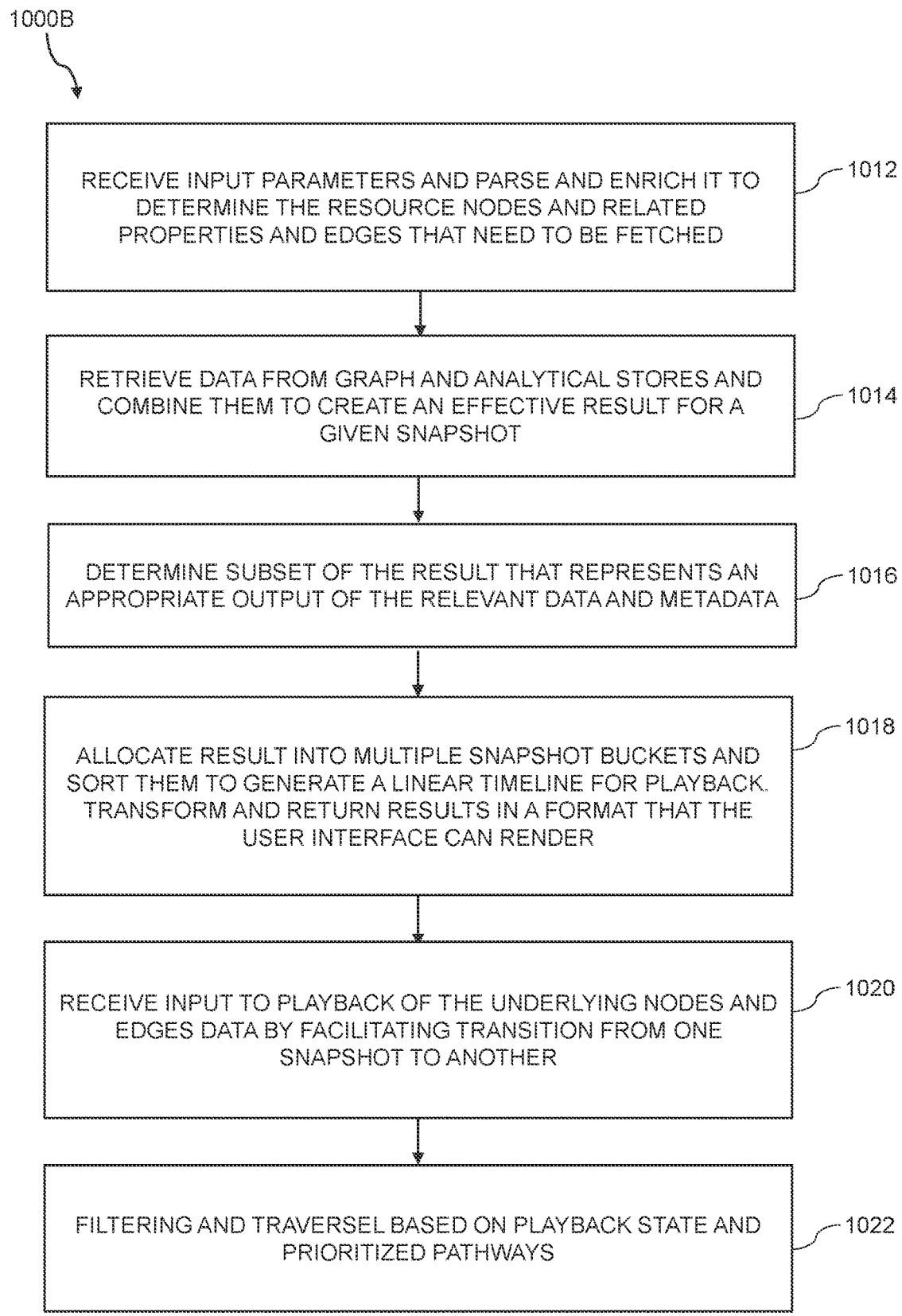
FIG. 10B illustrates an exemplary flow diagram representation of a simple key search query method for multi-cloud infrastructure and applications across time, in accordance with an embodiment of the present disclosure.

FIG. 10B illustrates an exemplary flow diagram representation of simple key search query method 1000B for multi-cloud infrastructure and applications 106 across time, in accordance with an embodiment of the present disclosure.

At step 1012, the method 1000B includes receiving, by the processor 226, input parameters to parse and enrich for determining the resource nodes and related properties and edges that need to be fetched. At step 1014, the method 1000B includes retrieving, by the processor 226, data from the graph and analytical data stores and combining the data to create an effective result for a given snapshot. At step 1016, the method 1000B includes determining, by the processor 226, a subset of the result that represents an appropriate output of the relevant data and metadata.

At step 1018, the method 1000B includes allocating, by the processor 226, results into multiple snapshot buckets and sorting them to generate a linear timeline for playback, transform and return results in a format that the user interface can render. At step 1020, the method 1000B includes receiving, by the processor 226, an input for playback of the underlying nodes and edges data by facilitating the transition from one snapshot to another. At step 1022, the method 1000B includes filtering and traversing, by the processor 226, based on playback state and prioritized pathways.

Figure 10C:
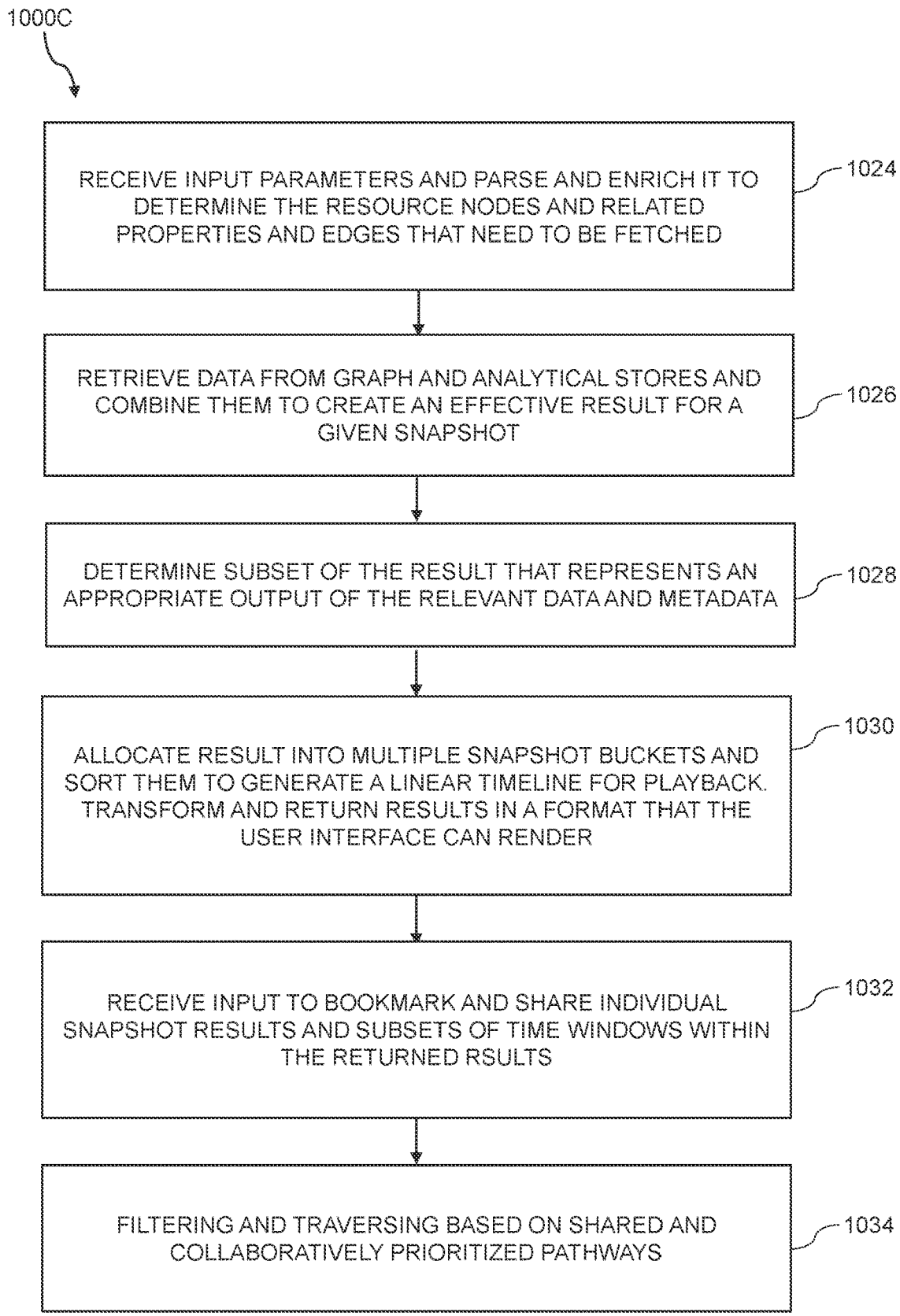
FIG. 10C illustrates an exemplary flow diagram representation of a simple key search query method for multi-cloud infrastructure and applications across time, and bookmark, and sharing of results to other users in a same organization, in accordance with an embodiment of the present disclosure.

FIG. 10C illustrates an exemplary flow diagram representation of a simple key search query method 1000C for multi-cloud infrastructure and applications 106 across time, bookmark, and sharing of results to other users in the same organization, in accordance with an embodiment of the present disclosure.

At step 1024, the method 1000C includes receiving, by the processor 226, input parameters to parse and enrich the input parameters for determining the resource nodes and related properties and edges that need to be fetched. At step 1026, the method 1000C includes retrieving, by the processor 226, data from a graph and analytical stores and combining them to create an effective result for a given snapshot. At step 1028, the method 1000C includes determining, by the processor 226, a subset of the result that represents an appropriate output of the relevant data and metadata.

At step 1030, the method 1000C includes allocating, by the processor 226, result into multiple snapshot buckets and sorting them to generate a linear timeline for playback, transform and return results in a format that the user interface can render. At step 1032, the method 1000C includes receiving, by the processor 226, input to bookmark and sharing individual snapshot results and subsets of time windows within the returned results. At step 1032, the method 1000C includes filtering and traversing, by the processor 226, the data, based on shared and collaboratively prioritized pathways.

Figure 11:
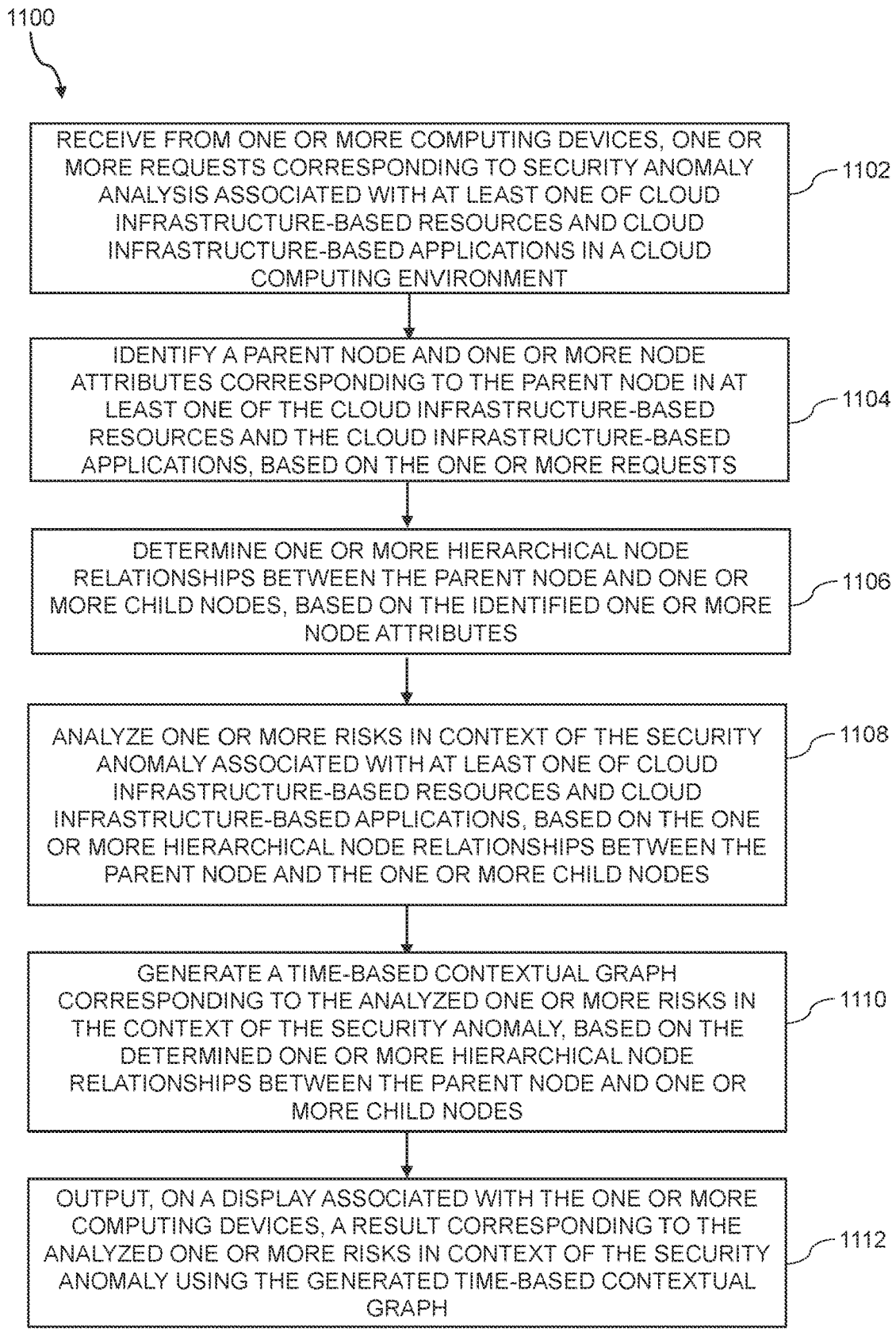
FIG. 11 illustrates an exemplary flow diagram representation of a method for generating a time-based contextual graph in a cloud computing environment, in accordance with an embodiment of the present disclosure.

FIG. 11 illustrates an exemplary flow diagram representation of a method 1100 for generating a time-based contextual graph in a cloud computing environment, in accordance with an embodiment of the present disclosure.

At step 1102, the method 1100 may include receiving, by the system 102, from one or more computing devices 108, one or more requests corresponding to security anomaly analysis associated with at least one of cloud infrastructure-based resources and cloud infrastructure-based applications in a cloud computing environment. In an embodiment, the one or more requests are a combination of natural language and a query language. In an embodiment, the one or more requests comprise, but are not limited to, a type of the plurality of resources to search for, an identity of the plurality of resources to search for, a type of edge relationship between the plurality of resources to search for, properties of the plurality of resources to search for, a type of the plurality of target resources to search for, additional inferred properties of the plurality of resources to search for, status of the plurality of resources to search on over time, and the like. In an embodiment, the security anomaly analysis may be based on at least one of one or more events and potential problem assessment (PPA).

At step 1104, the method 1100 may include identifying, by the system 102, a parent node and one or more node attributes corresponding to the parent node in at least one of the cloud infrastructure-based resources and the cloud infrastructure-based applications, based on the one or more requests. In an embodiment, the one or more node attributes comprises at least one of a plurality of resources connected to the parent node and the one or more child nodes, policies associated with the parent node and the one or more child nodes, configurations associated with the parent node and the one or more child nodes, data flows associated with the parent node and one or more child nodes, type of the plurality of resources, one or more properties associated with the plurality of resources, an inference-based lookup results associated with the plurality of resources, a static relationship and a dynamic relationship of each of the plurality of resources.

At step 1106, the method 1100 may include determining, by the system 102, one or more hierarchical node relationships between the parent node and one or more child nodes, based on the identified one or more node attributes.

At step 1108, the method 1100 may include analyzing, by the system 102, one or more risks in the context of the security anomaly associated with at least one of cloud infrastructure-based resources and cloud infrastructure-based applications, based on the one or more hierarchical node relationships between the parent node and the one or more child nodes.

At step 1110, the method 1100 may include generating, by the system 102, a time-based contextual graph corresponding to the analyzed one or more risks in the context of the security anomaly, based on the determined one or more hierarchical node relationships between the parent node and one or more child nodes. In an embodiment, the time-based contextual graph comprises, but is not limited to, identities (IDs) of the parent node and the resources, common ancestor nodes of each of one or more child nodes, depth of a deepest node in the subgraph rooted at the common ancestor, metadata associated with the one or more requests, metrics, the metadata, interrelationships of the parent node and the one or more child nodes, network elements, non-network elements, devices, lifecycle events, and the like.

At step 1112, the method 1100 may include outputting, by the system 102, on a display associated with the one or more computing devices 108, a result corresponding to the analyzed one or more risks in the context of the security anomaly using the generated time-based contextual graph.

The order in which the method 1100 is described is not intended to be construed as a limitation, and any number of the described method blocks may be combined or otherwise performed in any order to implement the method 1100 or an alternate method. Additionally, individual blocks may be deleted from the method 1100 without departing from the spirit and scope of the present disclosure described herein. Furthermore, the method 1100 may be implemented in any suitable hardware, software, firmware, or a combination thereof, that exists in the related art or that is later developed. The method 1100 describes, without limitation, the implementation of the system 102. A person of skill in the art will understand that method 1100 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

The present invention includes some advantages. The system 102 allows the users (e.g., the security analyst, the operation engineer, and the like) who are concerned with cloud infrastructure and application 106 security and reliability to investigate, analyze, and understand threats, attacks, breaches, vulnerabilities, and risks in the context of the use cases such as response to an incident, investigation of a possible situation currently unfolding, what-if analysis of a possible scenario, and forensics and post-mortem effectively and efficiently.

Further, the present invention helps the user to easily view and analyze the changes in the plurality of resources (i.e., the evolution of the plurality of resources in the graphical representation) over time, which is extremely difficult and often unachievable in most cloud infrastructure and application environments 106 within a reasonable amount of time. The present invention further avoids manual stitching of data for scenario understanding and investigation. Further, the present invention makes the users more productive by allowing the users to conduct larger volumes of investigation. The present invention further makes the process of the investigation more accurate (i.e., avoid errors), efficient (i.e., very fast and easy), and effective (i.e., brings in all possible relationships and contextual aspects which is usually difficult when performed manually or using multiple different tools).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented system for generating a time-based contextual graph in a cloud computing environment, the system comprising:
 a processor; and
 a memory coupled to the processor, wherein the memory comprises a set of program instructions in form of a plurality of subsystems that are configured to be executed by the processor, wherein the plurality of subsystems comprises:

receiving, by a request receiving subsystem, from one or more computing devices, one or more requests corresponding to security anomaly analysis associated with at least one of cloud infrastructure-based resources and cloud infrastructure-based applications in a cloud computing environment;

identifying, by a parent node and attribute identifying subsystem, a parent node and one or more node attributes corresponding to the parent node in at least one of the cloud infrastructure-based resources and the cloud infrastructure-based applications, based on the one or more requests;

determining, by a hierarchical node relationship determining subsystem, one or more hierarchical node relationships between the parent node and one or more child nodes, based on the identified one or more node attributes;

analyzing, by a risk analyzing subsystem, one or more risks in context of the security anomaly associated with at least one of cloud infrastructure-based resources and cloud infrastructure-based applications, based on the one or more hierarchical node relationships between the parent node and the one or more child nodes;

generating, by a time-based contextual graph generating subsystem, a time-based contextual graph corresponding to the analyzed one or more risks in the context of the security anomaly, based on the determined one or more hierarchical node relationships between the parent node and one or more child nodes; and outputting, by a result outputting subsystem, on a display associated with the one or more computing devices, a result corresponding to the analyzed one or more risks in context of the security anomaly using the generated time-based contextual graph.

2. The computer-implemented system as claimed in claim 1 is further configured to:

retrieving, by a resource data retrieving subsystem, from a database, resource data corresponding to at least one of cloud infrastructure-based resources and cloud infrastructure-based applications, wherein the resource data comprises at least one of: metrics, metadata, interrelationships, network elements, non-network elements, connected devices, and lifecycle events;

extracting, by a relationship information extracting subsystem, relationship information from the retrieved resource data, wherein the relationship information comprises at least one of: the plurality of resources, infrastructure, applications, policies, operational data, vulnerability scans, user comments, and security events; and comparing, by an information comparing subsystem, request information associated with the one or more requests with the relationship information to generate the time-based contextual graph.

3. The computer-implemented system as claimed in claim 1 is further configured to:

determining, by the parent node and attribute identifying subsystem, periodically, by a subsystem, a change in one or more node attributes;

obtaining, by the hierarchical node relationship determining subsystem, one or more edges associated with the one or more child nodes, based on determining the change in one or more node attributes;

analyzing, by the hierarchical node relationship determining subsystem, an edge relationship between each of the one or more edges associated with the one or more child nodes, based on obtaining the one or more edges;

modifying, by the time-based contextual graph generating subsystem, the generated time-based contextual graph corresponding to the analyzed one or more risks in the context of the security anomaly, based on the analyzed edge relationship between of the one or more child nodes; and analyzing, by the risk analyzing subsystem, the security anomaly based on the change in the one or more node attributes in the generated time-based contextual graph and the modified time-based contextual graph, to output the one or more risks in context of the security anomaly.

4. The computer-implemented system as claimed in claim 1 is further configured to:

providing, by the time-based contextual graph generating subsystem, timeline of the plurality of resources in the graphical representation using a time-centric audit trail view, wherein the time-centric audit trail view displays exact modified time-based contextual graph, when the resource is changed.

5. The computer-implemented system as claimed in claim 1, wherein the security anomaly analysis is based on at least one of one or more events and potential problem assessment (PPA).

6. The computer-implemented system as claimed in claim 1, wherein the one or more node attributes comprises at least one of a plurality of resources connected to the parent node and the one or more child nodes, policies associated with the parent node and the one or more child nodes, configurations associated with the parent node and the one or more child nodes, data flows associated with the parent node and one or more child nodes, type of the plurality of resources, one or more properties associated with the plurality of resources, an inference-based lookup results associated with the plurality of resources, a static relationship and a dynamic relationship of each of the plurality of resources.

7. The computer-implemented system as claimed in claim 1, wherein the one or more requests comprises at least one of a type of the plurality of resources to search for, an identity of the plurality of resources to search for, a type of edge relationship between the plurality of resources to search for, properties of the plurality of resources to search for, a type of the plurality of target resources to search for, additional inferred properties of the plurality of resources to search for, and status of the plurality of resources to search on over time.

8. The computer-implemented system as claimed in claim 1, wherein the one or more requests are a combination of natural language and a query language.

9. The computer-implemented system as claimed in claim 1, wherein the time-based contextual graph comprises at least one of identities (IDs) of parent node and the resources, common ancestor nodes of each of one or more child nodes, depth of deepest node in the subgraph rooted at the common ancestor, metadata associated with the one or more requests, metrics, the metadata, interrelationships of the parent node and the one or more child nodes, network elements, non-network elements, devices, and lifecycle events.

10. A computer-implemented method for generating a time-based contextual graph in a cloud computing environment, the computer-implemented method comprising:

receiving, by a processor, from one or more computing devices, one or more requests corresponding to security anomaly analysis associated with at least one of cloud infrastructure-based resources and cloud infrastructure-based applications in a cloud computing environment;

identifying, by the processor, a parent node and one or more node attributes corresponding to the parent node in at least one of the cloud infrastructure-based resources and the cloud infrastructure-based applications, based on the one or more requests;

determining, by the processor, one or more hierarchical node relationships between the parent node and one or more child nodes, based on the identified one or more node attributes;

analyzing, by the processor, one or more risks in context of the security anomaly associated with at least one of cloud infrastructure-based resources and cloud infrastructure-based applications, based on the one or more hierarchical node relationships between the parent node and the one or more child nodes;

generating, by the processor, a time-based contextual graph corresponding to the analyzed one or more risks in the context of the security anomaly, based on the determined one or more hierarchical node relationships between the parent node and one or more child nodes; and outputting, by the processor, on a display associated with the one or more computing devices, a result corresponding to the analyzed one or more risks in context of the security anomaly using the generated time-based contextual graph.

11. The computer-implemented method as claimed in claim 10 further comprises:

retrieving, by the processor, from a database, resource data corresponding to at least one of cloud infrastructure-based resources and cloud infrastructure-based applications, wherein the resource data comprises at least one of: metrics, metadata, interrelationships, network elements, non-network elements, connected devices, and lifecycle events;

extracting, by the processor, relationship information from the retrieved resource data, wherein the relationship information comprises at least one of: the plurality of resources, infrastructure, applications, policies, operational data, vulnerability scans, user comments, and security events; and comparing, by the processor, request information associated with the one or more requests with the relationship information to generate the time-based contextual graph.

12. The computer-implemented method as claimed in claim 10 further comprises:

determining, by the processor, periodically, by a subsystem, a change in one or more node attributes;

obtaining, by the processor, one or more edges associated with the one or more child nodes, based on determining the change in one or more node attributes;

analyzing, by the processor, an edge relationship between each of the one or more edges associated with the one or more child nodes, based on obtaining the one or more edges;

modifying, by the processor, the generated time-based contextual graph corresponding to the analyzed one or more risks in the context of the security anomaly, based on the analyzed edge relationship between of the one or more child nodes; and analyzing, by the processor, the security anomaly based on the change in the one or more node attributes in the generated time-based contextual graph and the modified time-based contextual graph, to output the one or more risks in context of the security anomaly.

13. The computer-implemented method as claimed in claim 10, further comprises providing timeline of the plurality of resources in the graphical representation using a time-centric audit trail view, wherein the time-centric audit trail view displays exact modified time-based contextual graph, when the resource is changed.

14. The computer-implemented method as claimed in claim 10, wherein the security anomaly analysis is based on at least one of one or more events and potential problem assessment (PPA).

15. The computer-implemented method as claimed in claim 10, wherein the one or more node attributes comprises at least one of a plurality of resources connected to the parent node and the one or more child nodes, policies associated with the parent node and the one or more child nodes, configurations associated with the parent node and the one or more child nodes, data flows associated with the parent node and one or more child nodes, type of the plurality of resources, one or more properties associated with the plurality of resources, an inference-based lookup results associated with the plurality of resources, a static relationship and a dynamic relationship of each of the plurality of resources.

16. The computer-implemented method as claimed in claim 10, wherein the one or more requests comprises at least one of a type of the plurality of resources to search for, an identity of the plurality of resources to search for, a type of edge relationship between the plurality of resources to search for, properties of the plurality of resources to search for, a type of the plurality of target resources to search for, additional inferred properties of the plurality of resources to search for, and status of the plurality of resources to search on over time.

17. The computer-implemented method as claimed in claim 10, wherein the one or more requests are a combination of natural language and a query language.

18. The computer-implemented method as claimed in claim 10, wherein the time-based contextual graph comprises at least one of identities (IDs) of parent node and the resources, common ancestor nodes of each of one or more child nodes, depth of deepest node in the subgraph rooted at the common ancestor, metadata associated with the one or more requests, metrics, the metadata, interrelationships of the parent node and the one or more child nodes, network elements, non-network elements, devices, and lifecycle events.

19. A non-transitory computer-readable storage medium comprising machine-readable instructions, which when executed by a processor, cause the processor to:

receive, from one or more computing devices, one or more requests corresponding to security anomaly analysis associated with at least one of cloud infrastructure-based resources and cloud infrastructure-based applications in a cloud computing environment;

identify a parent node and one or more node attributes corresponding to the parent node in at least one of the cloud infrastructure-based resources and the cloud infrastructure-based applications, based on the one or more requests;

determine one or more hierarchical node relationships between the parent node and one or more child nodes, based on the identified one or more node attributes;

analyze one or more risks in context of the security anomaly associated with at least one of cloud infrastructure-based resources and cloud infrastructure-based applications, based on the one or more hierarchical node relationships between the parent node and the one or more child nodes;

generate a time-based contextual graph corresponding to the analyzed one or more risks in the context of the security anomaly, based on the determined one or more hierarchical node relationships between the parent node and one or more child nodes; and output, on a display associated with the one or more computing devices, a result corresponding to the analyzed one or more risks in context of the security anomaly using the generated time-based contextual graph.

20. The non-transitory computer-readable storage medium as claimed in claim 19, wherein the processor is further configured to:

retrieve, from a database, resource data corresponding to at least one of cloud infrastructure-based resources and cloud infrastructure-based applications, wherein the resource data comprises at least one of: metrics, metadata, interrelationships, network elements, non-network elements, connected devices, and lifecycle events;

extract relationship information from the retrieved resource data, wherein the relationship information comprises at least one of: the plurality of resources, infrastructure, applications, policies, operational data, vulnerability scans, user comments, and security events; and compare request information associated with the one or more requests with the relationship information to generate the time-based contextual graph.

* * * * *